(12) United States Patent
Wright et al.

(10) Patent No.: US 7,131,165 B2
(45) Date of Patent: *Nov. 7, 2006

(54) UPRIGHT VACUUM CLEANER WITH CYCLONIC AIRFLOW

(75) Inventors: Michael F. Wright, Stow, OH (US); Charles J. Thur, Mentor, OH (US); Brett Latimer, Mentor, OH (US); Paul D. Stephens, Cleveland Heights, OH (US); Mark E. Cipolla, Chardon, OH (US); Craig J. Barbeck, North Royalton, OH (US)

(73) Assignee: Royal Appliance Mfg. Co., Glenwillow, OH (US)

(*) Notice: Subject to any disclaimer, the term of this patent is extended or adjusted under 35 U.S.C. 154(b) by 22 days.

This patent is subject to a terminal disclaimer.

(21) Appl. No.: 10/939,190

(22) Filed: Sep. 10, 2004

(65) Prior Publication Data

US 2005/0055796 A1  Mar. 17, 2005

Related U.S. Application Data

(63) Continuation of application No. 10/622,897, filed on Jul. 17, 2003, now Pat. No. 6,848,146, which is a continuation of application No. 10/271,037, filed on Oct. 15, 2002, now Pat. No. 6,745,432, which is a continuation of application No. 09/900,557, filed on Jul. 6, 2001, now Pat. No. 6,463,622, which is a continuation of application No. 09/415,363, filed on Oct. 8, 1999, now Pat. No. 6,260,234, which is a continuation-in-part of application No. 09/122,541, filed on Jul. 24, 1998, now Pat. No. 6,026,540, which is a continuation-in-part of application No. 09/004,999, filed on Jan. 9, 1998, now Pat. No. 6,003,196.

(51) Int. Cl.
*A47L 9/16* (2006.01)

(52) U.S. Cl. .................... 15/353; 15/352; 55/337; 55/429; 55/DIG. 3

(58) Field of Classification Search ............. 15/350, 15/351, 352, 353; 55/DIG. 3, 337, 429
See application file for complete search history.

(56) References Cited

U.S. PATENT DOCUMENTS

| | | | |
|---|---|---|---|
| 930,125 A | 8/1909 | Barrett | |
| 1,003,844 A | 9/1911 | Winans | |
| 1,029,562 A | 6/1912 | Prentiss | |
| 1,133,543 A | 3/1915 | Duffie | |
| 1,167,219 A | 1/1916 | Replogle | |
| 1,230,827 A | 6/1917 | Duffie | |
| 1,234,095 A | 7/1917 | Duffie | |
| 1,768,617 A | 7/1930 | Lee | |
| 1,887,600 A | 11/1932 | Replogle | |
| 2,019,895 A | 11/1935 | Dow | |
| 2,171,248 A | 8/1939 | Van Berkel | |
| 2,187,164 A | 1/1940 | Leathers | |
| 2,266,075 A | 12/1941 | Replogle | |
| 2,316,836 A | 4/1943 | Breuer | |
| 2,394,923 A | 2/1946 | Little | |
| 2,475,808 A | 7/1949 | Storm, Jr. | |
| 2,507,897 A | 5/1950 | Gavagnin | |
| 2,516,707 A | 7/1950 | Lewyt et al. | |
| 2,524,117 A | 10/1950 | Storm, Jr. | |
| 2,542,634 A | 2/1951 | Davis et al. | |
| 2,564,339 A | 8/1951 | Nerheim | |
| 2,643,733 A | 6/1953 | Shellman | |
| 2,648,396 A | 8/1953 | Kirby | |
| 2,806,242 A * | 9/1957 | Sparklin | 15/351 |
| 2,921,646 A | 1/1960 | Poole | |
| 3,055,039 A | 9/1962 | Smith | |
| 3,177,635 A | 4/1965 | Cawl et al. | |
| 3,218,783 A | 11/1965 | Ripple | |
| 3,320,727 A | 5/1967 | Farley et al. | |
| 3,413,779 A | 12/1968 | Takahashi et al. | |
| 3,425,192 A | 2/1969 | Davis | |
| 3,543,325 A | 12/1970 | Hamrick | |
| 3,614,860 A | 10/1971 | Grellsson | |
| 3,626,545 A | 12/1971 | Sparrow | |
| 3,797,064 A | 3/1974 | MacFarland | 15/351 |
| 3,820,310 A | 6/1974 | Fromknecht et al. | 55/447 |
| 3,853,518 A | 12/1974 | Tu et al. | 55/337 |
| 3,877,902 A | 4/1975 | Eriksson et al. | |
| 3,910,781 A | 10/1975 | Bryant, Jr. | |

| | | | |
|---|---|---|---|
| 4,072,483 A | 2/1978 | Doyle, Jr. | 55/372 |
| 4,108,778 A | 8/1978 | Lambert et al. | 210/297 |
| 4,118,208 A | 10/1978 | Klinedinst | 55/433 |
| 4,172,710 A | 10/1979 | van der Molen | 55/340 |
| 4,198,726 A | 4/1980 | Powell, Jr. | 55/337 |
| 4,268,288 A | 5/1981 | Coombs | 55/337 |
| 4,276,070 A | 6/1981 | Hug | 55/429 |
| 4,284,422 A | 8/1981 | Ferland | 55/300 |
| 4,355,434 A | 10/1982 | Gongwer | 15/352 |
| 4,373,228 A | 2/1983 | Dyson | 15/350 |
| 4,426,211 A | 1/1984 | Ataka et al. | 55/296 |
| 4,443,235 A | 4/1984 | Brenholt et al. | 55/218 |
| 4,457,043 A | 7/1984 | Oeberg et al. | 15/346 |
| 4,486,206 A | 12/1984 | Miyakawa et al. | 55/337 |
| 4,571,772 A | 2/1986 | Dyson | 15/335 |
| 4,573,236 A | 3/1986 | Dyson | 15/333 |
| 4,581,787 A | 4/1986 | Torigoe et al. | 15/351 |
| 4,593,429 A | 6/1986 | Dyson | 15/353 |
| 4,643,748 A | 2/1987 | Dyson | 55/338 |
| 4,665,582 A | 5/1987 | Richmond et al. | 15/344 |
| 4,718,924 A | 1/1988 | DeMarco | 55/302 |
| RE32,751 E | 9/1988 | Joss et al. | 15/329 |
| 4,769,052 A | 9/1988 | Kowalski | 55/379 |
| 4,826,515 A | 5/1989 | Dyson | 55/345 |
| 4,853,008 A | 8/1989 | Dyson | 55/345 |
| 4,853,011 A | 8/1989 | Dyson | 55/345 |
| 4,934,019 A | 6/1990 | Shorthill et al. | 15/339 |
| 4,944,780 A | 7/1990 | Usmani | 55/337 |
| 4,960,446 A | 10/1990 | Werner et al. | 55/312 |
| 4,967,443 A | 11/1990 | Krasznai et al. | 15/347 |
| 5,018,240 A | 5/1991 | Holman | 15/349 |
| 5,020,186 A | 6/1991 | Lessig et al. | 15/339 |
| 5,062,870 A | 11/1991 | Dyson | 55/213 |
| 5,078,761 A | 1/1992 | Dyson | 55/213 |
| 5,080,697 A | 1/1992 | Finke | 55/97 |
| 5,090,975 A | 2/1992 | Requejo et al. | 55/97 |
| 5,090,976 A | 2/1992 | Dyson | 55/337 |
| 5,101,532 A | 4/1992 | Dyson et al. | 15/320 |
| 5,106,488 A | 4/1992 | Jonasson | 209/17 |
| 5,107,567 A | 4/1992 | Ferrari et al. | 15/350 |
| 5,129,125 A | 7/1992 | Gamou et al. | 15/352 |
| 5,135,552 A | 8/1992 | Weistra | 55/337 |
| 5,145,499 A | 9/1992 | Dyson | 55/337 |
| 5,160,356 A | 11/1992 | Dyson | 55/337 |
| 5,230,722 A | 7/1993 | Yonkers | 55/337 |
| 5,248,323 A | 9/1993 | Stevenson | 95/90 |
| 5,254,147 A | 10/1993 | Finke | 15/353 |
| 5,267,371 A | 12/1993 | Soler et al. | 15/322.5 |
| 5,271,751 A | 12/1993 | Lagler et al. | 55/293 |
| 5,287,591 A | 2/1994 | Rench et al. | 15/352 |
| 5,307,538 A | 5/1994 | Rench et al. | 15/352 |
| 5,427,597 A | 6/1995 | Osendorf | 55/487 |
| 5,464,460 A | 11/1995 | Bosses | 55/374 |
| 5,524,321 A | 6/1996 | Weaver et al. | 15/329 |
| 5,558,697 A | 9/1996 | Dyson et al. | 95/12 |
| 5,593,479 A | 1/1997 | Frey et al. | 96/57 |
| 5,603,741 A | 2/1997 | Frey | 55/368 |
| 5,659,922 A | 8/1997 | Louis | 15/350 |
| 5,685,894 A | 11/1997 | Bowerman et al. | 96/63 |
| 5,690,713 A | 11/1997 | Bowerman et al. | |
| 5,704,956 A | 1/1998 | Loveless et al. | 55/305 |
| 5,725,623 A | 3/1998 | Bowerman et al. | 55/490 |
| 5,746,795 A | 5/1998 | Witter | 55/472 |
| 5,779,745 A | 7/1998 | Kilström | 55/337 |
| 5,795,358 A | 8/1998 | Scanlon et al. | 55/320 |
| D398,097 S | 9/1998 | Murphy et al. | D32/22 |
| 5,829,090 A | 11/1998 | Melito et al. | 15/352 |
| 5,845,782 A | 12/1998 | Depew | |
| 5,867,863 A | 2/1999 | McCormick | 15/351 |
| 5,922,093 A | 7/1999 | James et al. | 55/322 |
| 5,935,279 A | 8/1999 | Kilström | 55/337 |
| 5,946,771 A | 9/1999 | Bosyj et al. | 15/347 |
| 5,961,677 A | 10/1999 | Scott | 55/385.1 |
| 6,012,200 A | 1/2000 | Murphy et al. | 15/347 |
| 6,035,486 A | 3/2000 | McCormick | 15/352 |
| 6,070,291 A | 6/2000 | Bair et al. | 15/347 |
| 6,085,382 A | 7/2000 | Bobrosky et al. | 15/350 |
| 6,146,434 A | 11/2000 | Scalfani et al. | 55/334 |
| 6,168,641 B1 | 1/2001 | Tuvin et al. | |
| 6,192,550 B1 | 2/2001 | Hamada et al. | 15/352 |
| 6,256,834 B1 | 7/2001 | Meijer et al. | |
| 6,341,404 B1 | 1/2002 | Salo et al. | |
| 6,401,295 B1 | 6/2002 | Bair et al. | |
| 6,463,622 B1 | 10/2002 | Wright et al. | |
| 6,546,593 B1 | 4/2003 | Oh et al. | |
| 6,591,446 B1 | 7/2003 | Bair et al. | |
| 6,735,815 B1 | 5/2004 | Bair et al. | |
| 6,735,817 B1 | 5/2004 | Bair et al. | |
| 6,745,432 B1 | 6/2004 | Wright et al. | |
| 6,775,882 B1 | 8/2004 | Murphy et al. | |
| 6,848,146 B1 | 2/2005 | Wright et al. | |
| 6,857,164 B1 | 2/2005 | Bair et al. | |
| 6,901,626 B1 | 6/2005 | Bair et al. | |
| 2004/0205929 A1* | 10/2004 | Bair et al. | 15/353 |
| 2005/0028318 A1* | 2/2005 | Bair et al. | 15/353 |
| 2005/0091787 A1 | 5/2005 | Bair et al. | |

FOREIGN PATENT DOCUMENTS

| | | |
|---|---|---|
| CN | 99240614.5 | 10/1999 |
| EP | 0042 723 | 12/1981 |
| EP | 0 245 224 A | 11/1987 |
| EP | 0 489 468 A1 | 6/1992 |
| EP | 0 557 096 A1 | 8/1993 |
| FR | 1094603 | 12/1954 |
| FR | 1468142 | 2/1966 |
| FR | 1468142 | 4/1967 |
| GB | 28794 | 12/1913 |
| GB | 479455 | 2/1938 |
| GB | 1049292 | 2/1964 |
| GB | 1111074 | 4/1968 |
| GB | 2 246 717 A | 2/1992 |
| GB | 2265096 A | 9/1993 |
| GB | 2280388 A | 2/1995 |
| GB | 2298598 | 9/1996 |
| JP | H3-103059 | 4/1991 |
| JP | H3-103057 | 10/1991 |
| JP | 11-267434 | 10/1999 |
| WO | WO 84 02282 A | 6/1984 |
| WO | WO 99/30602 | 6/1999 |
| WO | WO 99/30604 | 6/1999 |
| WO | WO 99/30605 | 6/1999 |

OTHER PUBLICATIONS

Japanese Language Brochure Concerning National Product No. MC-11U, Feb. 1981.
Fantom Vacuum Cleaner Owner's Manual (© 1993).
Fantom. Fury Vacuum Cleaner Owner's Manual (© 1995).
Fantom Vacuum Cleaner Service Manual for Iona® Model Series F-9000.
Dyson DC 03 Operating Manual, Dec. 11, 1997.
"Flair on the Floor" Appliance, Dec. 1994, pp. 24-28.
Pictures of Shop-Vac QSP 16 Gallon Wet/Dry Vacuum and Excerpt of Shop Vac Article, Popular Mechanics, Sep. 1996, p. 88.
"The Bagless Vac A World First", Appliance Manufacturer, Feb. 1992, pp. 21-22.

* cited by examiner

*Primary Examiner*—Theresa T. Snider
(74) *Attorney, Agent, or Firm*—Fay, Sharpe, Fagan, Minnich & McKee, LLP

(57) ABSTRACT

A vacuum cleaner includes a first housing defining a cyclonic airflow chamber and a second housing defining a main suction opening that is in communication with an inlet of the cyclonic chamber. A suction source has a suction airstream inlet in communication with an outlet of the cyclonic chamber, and establishes a suction airstream that enters said main suction opening, passes through said cyclonic chamber, and passes to an outlet of said suction source. A substantial portion of particulates entrained in the suction airstream are separated therefrom when said suction airstream moves in a cyclonic fashion through the cyclonic chamber. A main filter assembly, preferably including filter medium comprising polytetrafluoroethylene (PTFE), is located in the cyclonic chamber so that a suction airstream moving from the main suction opening to the inlet of said suction source by way of the cyclonic airflow chamber passes through the filter medium thereof after said airstream moves in a cyclonic fashion within the cyclonic airflow chamber to remove residual particulates from the suction airstream before it leaves the cyclonic chamber. A HEPA filter can be provided to filter the suction airstream exhausted through the outlet of the suction source prior to the airstream being discharged from the vacuum.

74 Claims, 15 Drawing Sheets

UPRIGHT VACUUM CLEANER WITH CYCLONIC AIRFLOW

This application is a continuation of application Ser. No. 10/622,897 filed on Jul. 17, 2003 now U.S. Pat. No. 6,848,146 which issued on Feb. 1, 2005. That application is a continuation of application Ser. No. 10/271,037 filed Oct. 15, 2002 now U.S. Pat. No. 6,745,432 which issued on Jun. 8, 2004. That application was a continuation of U.S. Ser. No. 09/900,557 filed on Jul. 6, 2001 and which issued on Oct. 15, 2002 as Pat. No. 6,463,622. That application was a continuation of U.S. Ser. No. 09/415,363 filed Oct. 8, 1999, now U.S. Pat. No. 6,260,234 B1, which is a continuation-in-part of U.S. Ser. No. 09/122,541 filed on Jul. 24, 1998 now U.S. Pat. No. 6,026,540 which issued on Feb. 22, 2000. That case, in turn, was a continuation-in-part of U.S. Ser. No. 09/004,999 filed Jan. 9, 1998, now U.S. Pat. No. 6,003,196 dated Dec. 21, 1999.

BACKGROUND OF THE INVENTION

The present invention relates to vacuum cleaners. More particularly, the present invention relates to upright vacuum cleaners used for suctioning dirt and debris from carpets and floors.

Upright vacuum cleaners are ubiquitous. They are known to include an upper portion having a handle, by which an operator of the vacuum cleaner may grasp and maneuver the cleaner, and a lower cleaning nozzle portion which travels across a floor, carpet, or other surface being cleaned. The upper portion is often formed as a rigid plastic housing which encloses a dirt and dust collecting filter bag, although the upper portion may simply be an elongated handle with the filter bag, and an external cloth bag, being hung therefrom. The cleaning nozzle is hingedly connected to the upper handle portion such that the upper portion is pivotable between a generally vertical upright storage position and an inclined operative position. The underside of the nozzle includes a suction opening formed therein which is in fluid communication with the filter bag.

A vacuum or suction source such as a motor and fan assembly is enclosed either within the nozzle portion or the upper portion of the cleaner. The vacuum source generates the suction required to pull dirt from the carpet or floor being vacuumed through the suction opening and into the filter bag. A rotating brush assembly is typically provided in proximity with the suction opening to loosen dirt and debris from the surface being vacuumed.

To avoid the need for vacuum filter bags, and the associated expense and inconvenience of replacing the bag, another type of upright vacuum cleaner utilizes cyclonic airflow, rather than a filter bag, to separate a majority of the dirt and other particulates from the suction airstream. The air is then filtered to remove residual particulates, returned to the motor, and exhausted.

Such prior cyclonic airflow upright vacuum cleaners have not been found to be entirely effective and convenient to use. For example, with these prior cyclonic airflow vacuum cleaners, the process of emptying dust and dirt from the cyclonic chamber dirt collection container has been found to be inconvenient, and often resulted in the spillage of the cup contents. Likewise, with these prior units, replacement of the filter element has not been convenient. Other cyclonic airflow vacuum cleaners have been found to exhaust air which is not free of residual contaminants. For example, one prior unit filters the airstream after it passes through the cyclonic chamber, but thereafter passes the airstream through the motor assembly where it is potentially recontaminated by the motor assembly, itself, prior to its being exhausted into the atmosphere.

Because the cyclonic action of such vacuum cleaners does not completely remove all dust, dirt, and other contaminants from the suction airstream, it is necessary to include a filter downstream from the cyclonic chamber. As such, prior cyclonic airflow vacuum cleaners have heretofore included conventional, non-washable filter elements including a conventional filtering medium to filter the airstream after it passes through the cyclonic chamber. These prior filter elements have caused considerable difficulties. A conventional filter that is sufficiently fine to filter the airstream effectively unduly restricts airflow and decreases the effectiveness of the cyclonic action. On the other hand, a coarse filter does not effectively filter the airstream of residual contaminants. Further, conventional filter media, such as paper or fibrous media, has been found to clog readily, thereby unduly decreasing airflow rates over time. Thus, a need has been found for a cyclonic airflow vacuum cleaner with an effective filter positioned in the cyclonic chamber for effectively filtering the airstream without clogging. Further, a need has been found for such a vacuum cleaner including a washable, re-usable filter element from which dirt is easily extracted.

Accordingly, it has been deemed desirable to develop a new and improved upright vacuum cleaner that would overcome the foregoing difficulties and others while providing better and more advantageous overall results.

SUMMARY OF THE INVENTION

In accordance with a first aspect of the present invention, an upright vacuum cleaner includes an upright housing and a nozzle base hingedly interconnected with the upright housing. The nozzle base includes a main suction opening in its underside. A cyclonic airflow chamber is defined in the upright housing and is adapted for separating dust and dirt from a cyclonically circulating suction airstream. The main suction opening is in fluid communication with the cyclonic airflow chamber. A suction source is located in the upright housing or nozzle base and has a suction airflow inlet in fluid communication with the cyclonic chamber, and also includes a suction airflow outlet. A main filter assembly is located in the cyclonic chamber upstream from the suction source for filtering dust and dirt from a suction airstream that passes through the cyclonic airflow chamber. The main filter element extends upwardly within the cyclonic airflow chamber from a floor of a dirt container portion of said housing that defines a lower portion of the cyclonic airflow chamber and that is adapted for receiving and retaining dirt and dust separated from the suction airstream. A conduit depends into the cyclonic airflow chamber from an upper wall of the housing, and the conduit is axially aligned and mates with an upper end of the main filter assembly whereby the main filter assembly and the conduit together define a hollow column structure in the cyclonic airflow chamber.

In accordance with another aspect of the present invention, a vacuum cleaner comprises a first housing member defining a cyclonic airflow chamber adapted for separating entrained dirt and dust from a circulating airstream, and a second housing member defining a main suction opening. A first conduit fluidically connects the main suction opening to an inlet of the cyclonic airflow chamber. A suction source has a suction airstream inlet and a suction airstream outlet, and it is adapted for generating and maintaining a suction airstream flowing from the inlet downstream to the outlet. A second conduit fluidically connects an outlet of the cyclonic airflow chamber to the suction airstream inlet of the suction source. A main filter assembly includes a filter medium comprising a selectively permeable plastic material, and the main filter assembly is located in the cyclonic chamber so that a suction airstream moving from the main suction opening to the inlet of the suction source by way of the cyclonic airflow chamber passes through the filter medium after the airstream moves in a cyclonic fashion within the cyclonic airflow chamber.

In accordance with still another aspect of the present invention, a vacuum cleaner apparatus includes a nozzle defining a main suction opening, and a main suction source in communication with the main suction opening. The main suction source is adapted for establishing a suction airstream that moves into the main suction opening and downstream into the suction source. A cyclonic chamber is placed in communication with and between the main suction opening and the suction source, and the cyclonic chamber is adapted for imparting a cyclonic flow to the suction airstream whereby a portion of particulates entrained in the suction airstream are separated therefrom, leaving residual particulates entrained in the suction airstream. A filter assembly is located in the cyclonic chamber and includes a filter membrane placed in covering relation with an outlet of the cyclonic chamber. Residual particulates entrained in the suction airstream are blocked from exiting the cyclonic chamber by the filter membrane, and the filter assembly adapted for being selectively removed from the cyclonic chamber, washed to remove particulates from the membrane, and replaced in the cyclonic chamber for further filtering operations.

In accordance with yet another aspect of the present invention, a vacuum cleaner comprises a housing defining a cyclonic airflow chamber for separating contaminants from a suction airstream. The housing further defines a suction airstream inlet and a suction airstream outlet in fluid communication with the cyclonic airflow chamber. A nozzle base includes a main suction opening fluidically connected with the cyclonic airflow chamber inlet. An airstream suction source has an inlet fluidically connected to the cyclonic airflow chamber outlet and a suction source exhaust outlet. The suction source selectively establishes and maintains a suction airstream from the nozzle main suction opening to the suction source exhaust outlet. A main filter assembly is positioned in fluid communication between the cyclonic airflow chamber and the suction source and is adapted for filtering residual contaminants from the suction airstream downstream relative to the cyclonic airflow chamber. The main filter assembly comprising a polymeric filter membrane.

One advantage of the present invention is the provision of a new and improved vacuum cleaner.

Another advantage of the invention is found in the provision of a vacuum cleaner with a cyclonic airflow chamber through which the suction airstream flows for separating dust and dirt from the airstream and for depositing the separated dust and dirt into an easily and conveniently emptied dirt cup.

Still another advantage of the present invention resides in the provision of a cyclonic airflow upright vacuum cleaner with a main filter that effectively filters residual contaminants from the suction airstream between the cyclonic airflow chamber and the motor assembly without unduly restricting airflow and without premature clogging. Yet another advantage of the invention is the provision of a cyclonic airflow upright vacuum cleaner with a final filter located downstream from the suction motor assembly for filtering the suction airstream immediately prior to its exhaustion into the atmosphere.

A further advantage of the invention is the provision of a vacuum cleaner with a main filter, an auxiliary filter, and a final filter wherein the main, auxiliary, final filters are easily removable and replaceable.

A still further advantage of the present invention is the provision of a vacuum cleaner with a cyclonic airflow chamber and main filter element, wherein the main filter element is positioned in a removable dirt cup partially defining the cyclonic airflow chamber for ease of emptying the dirt cup and cleaning the filter.

A yet further advantage of the present invention resides in the provision of a vacuum cleaner with a cyclonic airflow chamber and a main filter assembly situated in the cyclonic airflow chamber, wherein the main filter assembly includes a re-usable filter element that is easily and repeatedly cleanable by washing.

Still other benefits and advantages of the invention will become apparent to those skilled in the art upon reading and understanding the following detailed description.

BRIEF DESCRIPTION OF THE DRAWINGS

The invention may take form in certain components and structures, preferred embodiments of which will be illustrated in the accompanying drawings wherein.

DETAILED DESCRIPTION OF THE PREFERRED EMBODIMENTS

Figure 1:
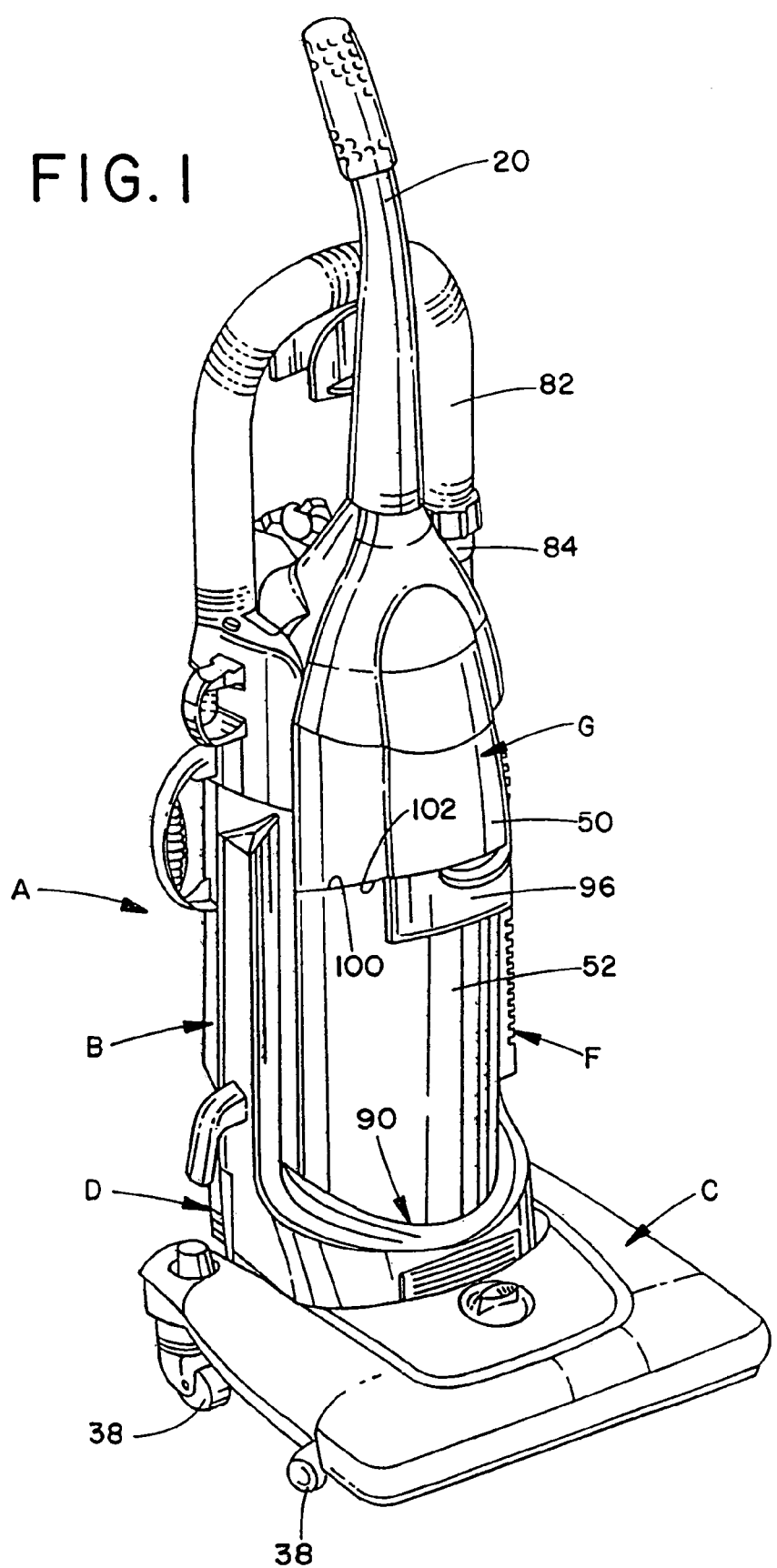
FIG. 1 is a perspective view illustrating a cyclonic airflow upright vacuum cleaner in accordance with the present invention.
Figure 2:
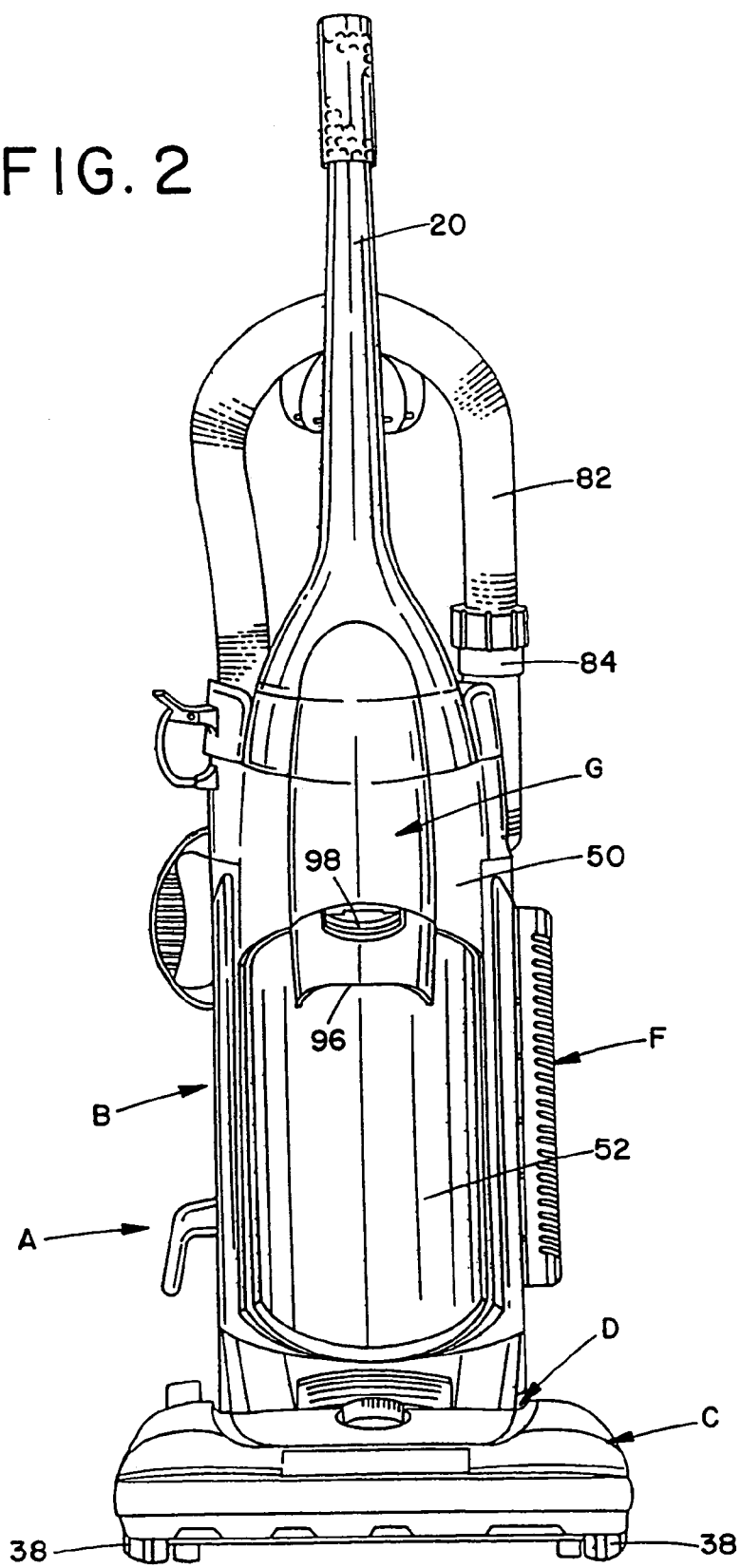
FIG. 2 is a front elevational view of the vacuum cleaner illustrated in FIG. 1.
Figure 3:
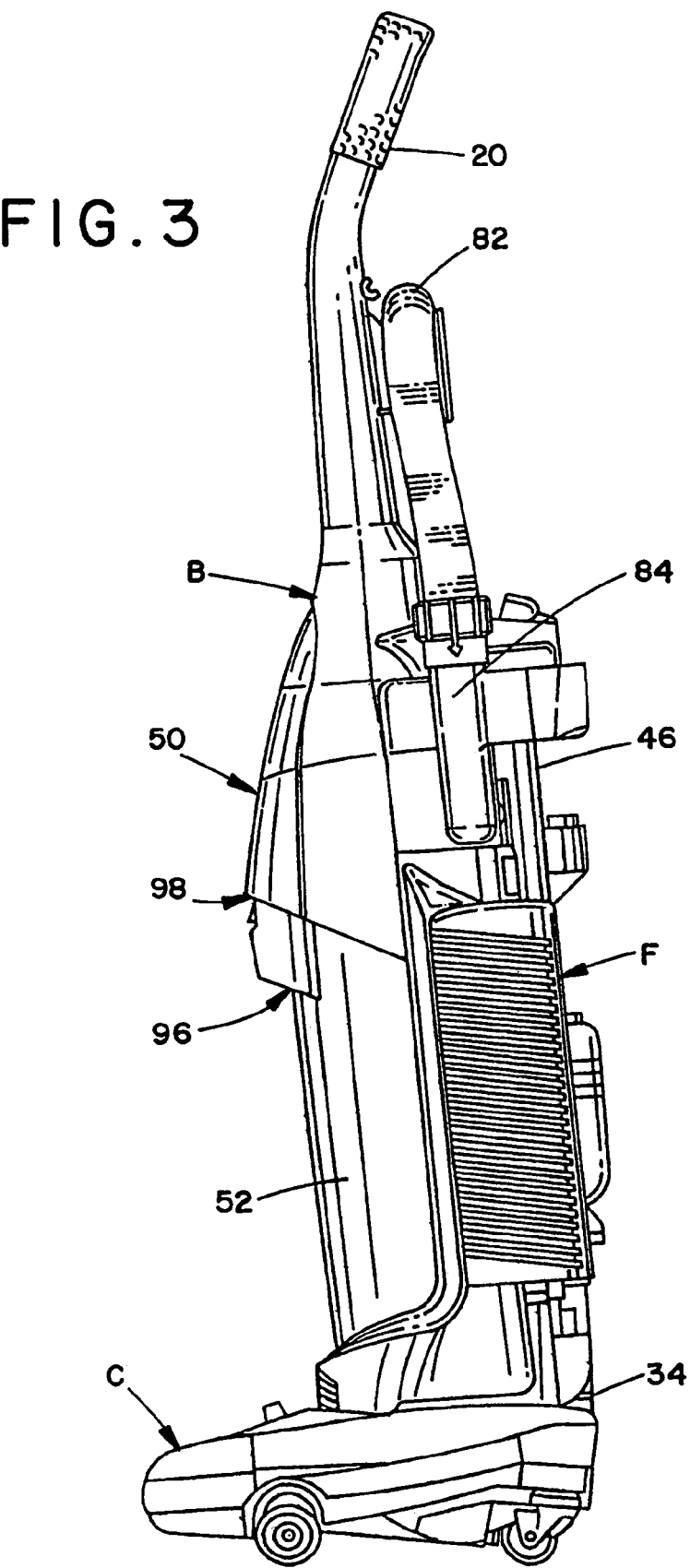
FIGS. 3 and 4 are left and right side elevational views, respectively, of the vacuum cleaner shown in FIG. 1.
Figure 4:
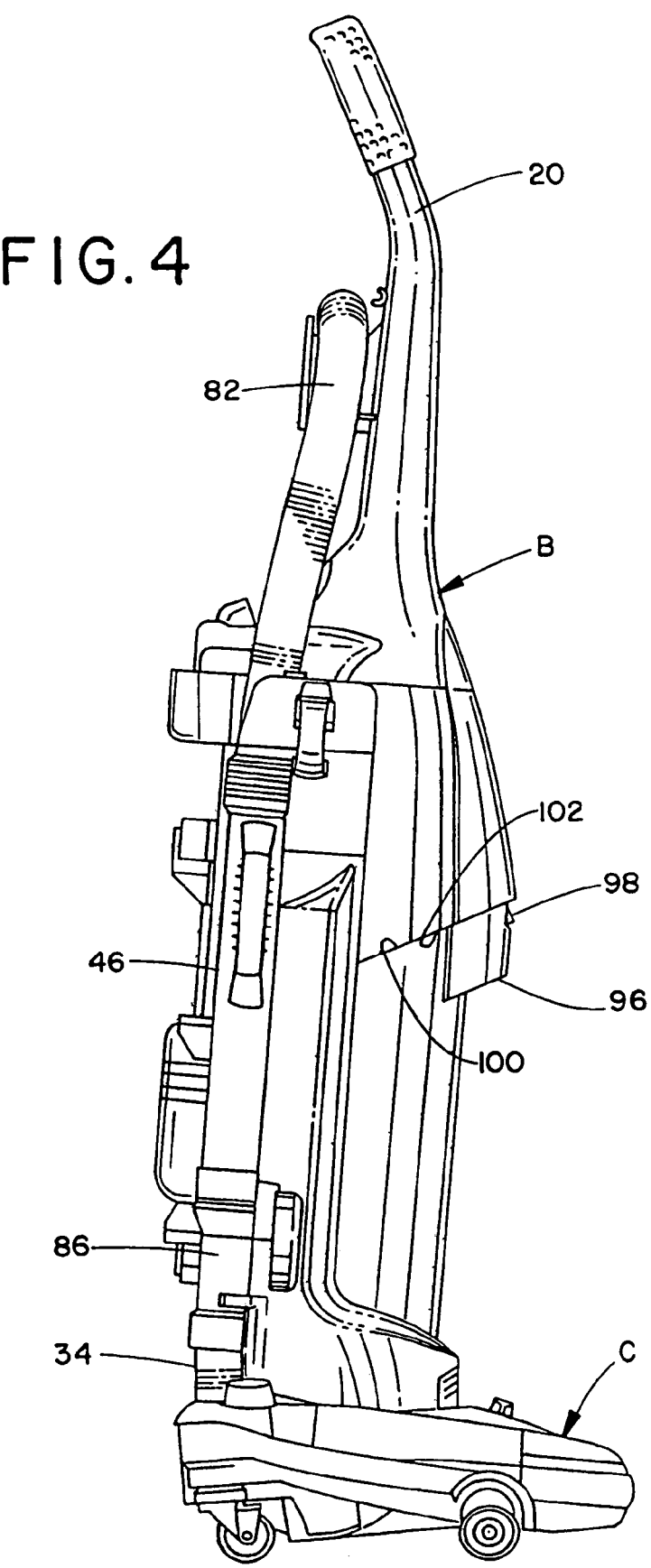

Referring now to the FIGURES, wherein the showings are for purposes of illustrating a preferred embodiment of the invention only and not for purposes of limiting the same, FIGS. 1–6 illustrate an upright vacuum cleaner A including an upright housing section B and a nozzle base section C. The sections B,C are pivotally or hingedly connected through the use of trunnions or another suitable hinge assembly D so that the upright housing section B pivots between a generally vertical storage position (as shown) and an inclined, operative position. Both the upright and nozzle sections B,C are preferably made from conventional materials such as molded plastics and the like. The upright section B includes a handle 20 extending upward therefrom by which an operator of the vacuum A is able to grasp and maneuver the vacuum.

During vacuuming operations, the nozzle base C travels across the floor, carpet, or other subjacent surface being cleaned. The underside 24 (FIG. 6) of the nozzle base includes a main suction opening 26 formed therein that extends substantially across the width of the nozzle base C at the front end thereof. The main suction opening 26 is in fluid communication with the vacuum upright body section B through a passage 30 and a connector hose assembly 34 (see also FIG. 5) or a like conduit. A rotating brush assembly 36 is positioned in the region of the nozzle main suction opening 26 for contacting and scrubbing the surface being vacuumed to loosen embedded dirt and dust. A plurality of wheels 38 support the nozzle base on the surface being cleaned and facilitate its movement thereacross.

Figure 5:
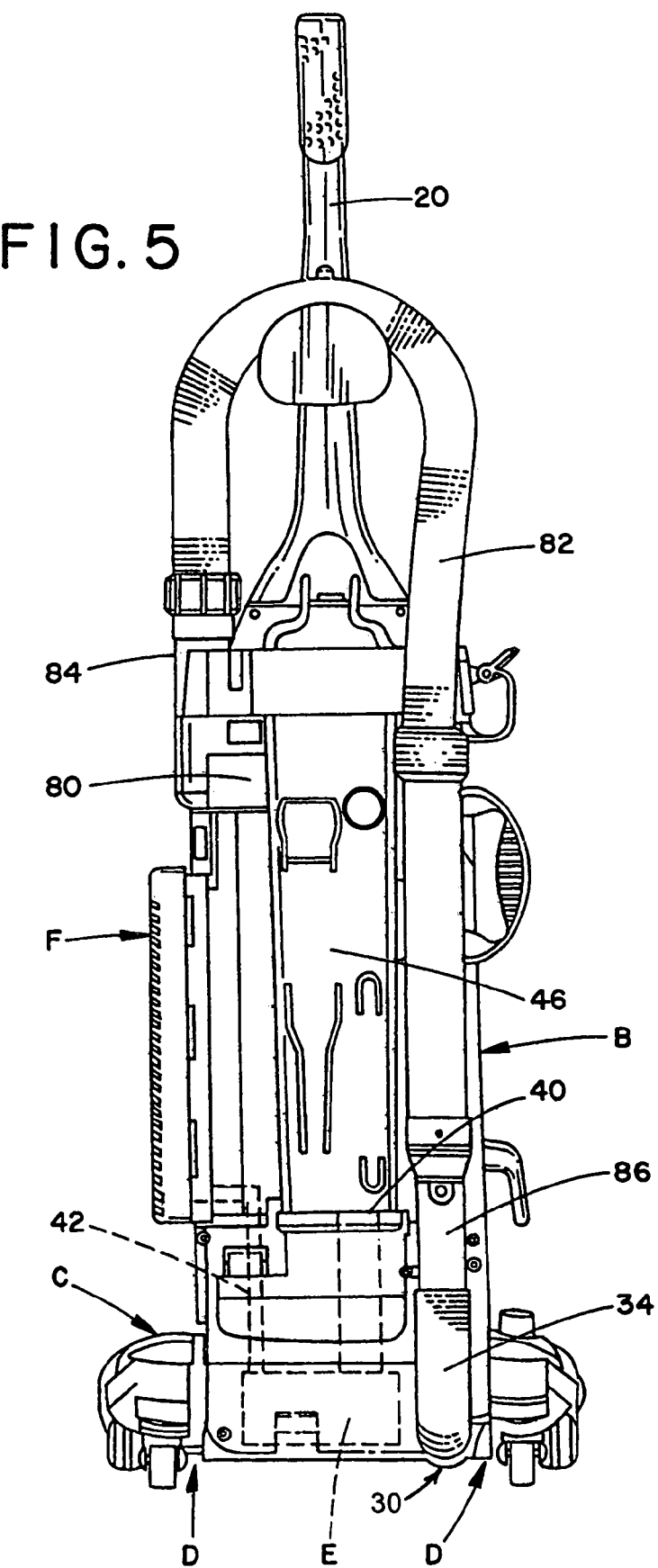
FIG. 5 is a rear elevational view of the vacuum cleaner of FIG. 1.
Figure 6:
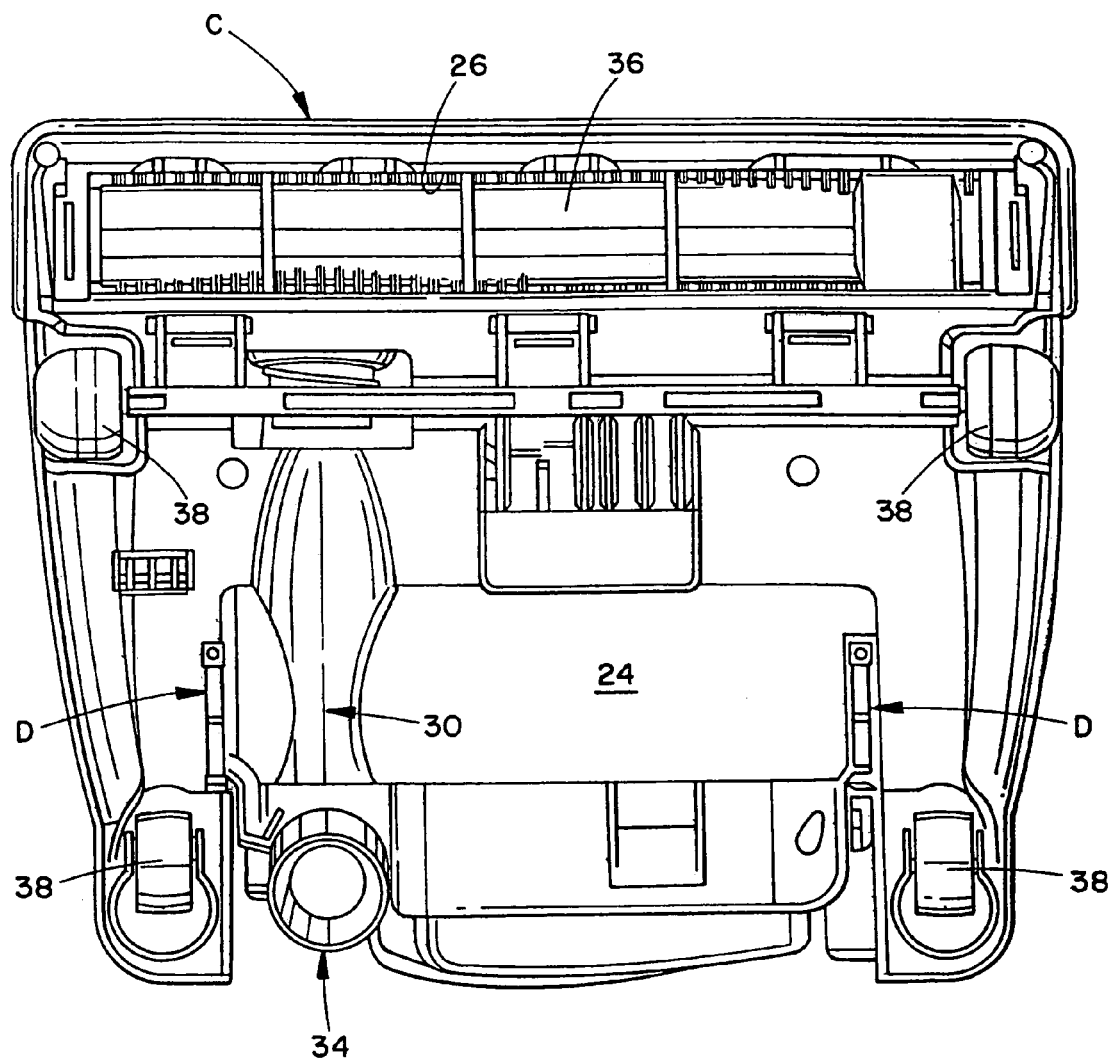
FIG. 6 is a bottom plan view of the vacuum cleaner of FIG. 1.
Figure 9:
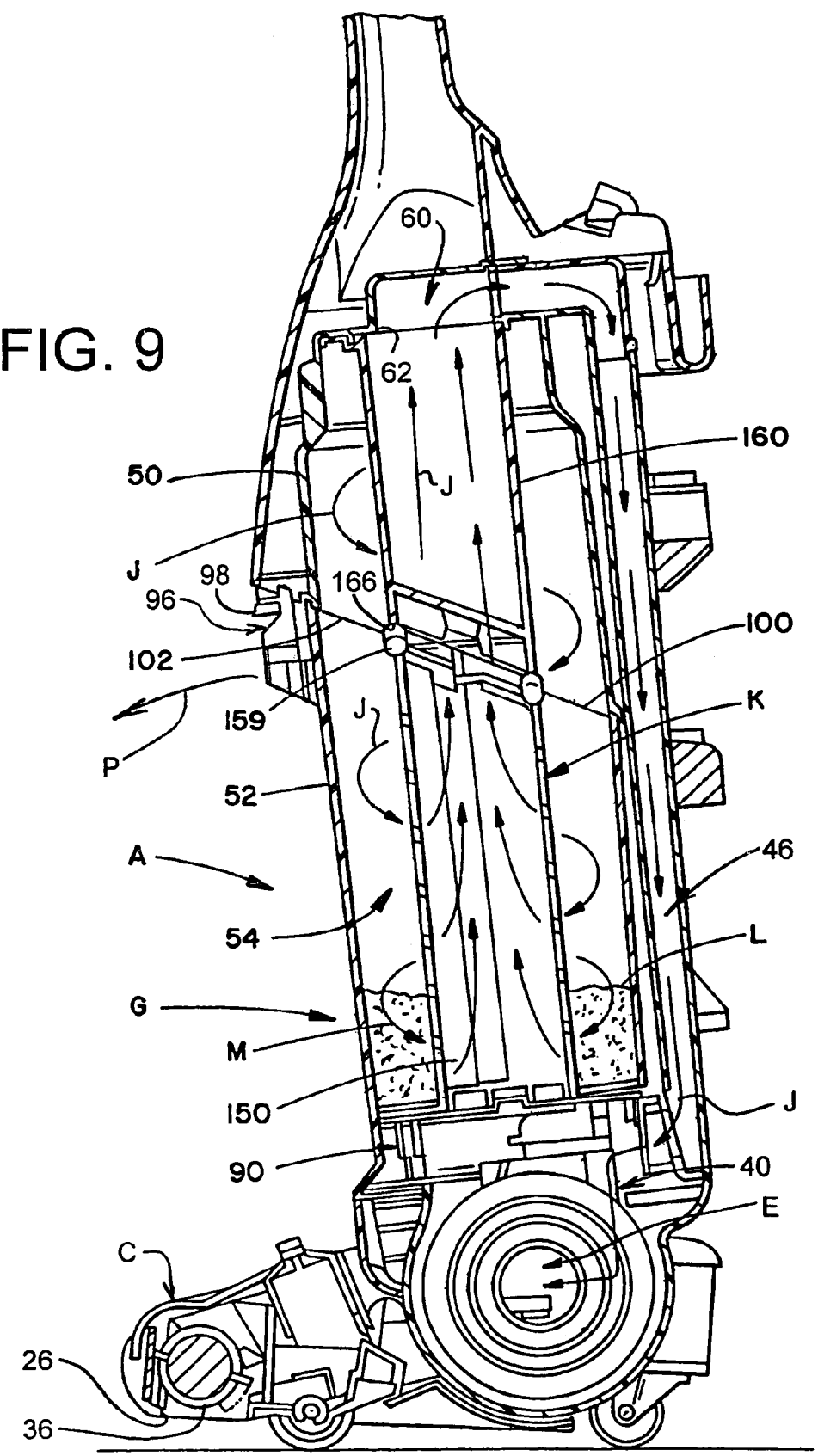
FIG. 9 is a side elevational view in cross-section of a vacuum cleaner with cyclonic airflow in accordance with a preferred embodiment of the present invention showing suction airflow through the cyclonic airflow dust and dirt separating chamber.

The upright vacuum cleaner A includes a vacuum or suction source for generating the required suction airflow for cleaning operations. With reference particularly to FIGS. 5 and 9, a suitable suction source, such as an electric motor and fan assembly E, generates a suction force in a suction inlet 40 and an exhaust force in an exhaust outlet 42. The exhaust outlet 42 of the motor assembly is in fluid communication with a downstream final filter assembly F for filtering residual contaminants from the airstream exhausted by the motor assembly immediately prior to discharge of the exhaust airstream into the atmosphere. The suction inlet 40 of the motor assembly E is in fluid communication with an upstream elongated suction conduit 46 that extends upwardly from the motor/fan assembly E to an upper region of the upright section B where it communicates with the cyclonic suction airflow dust and dirt separating region G of the vacuum A to generate a suction force therein.

Figure 7:
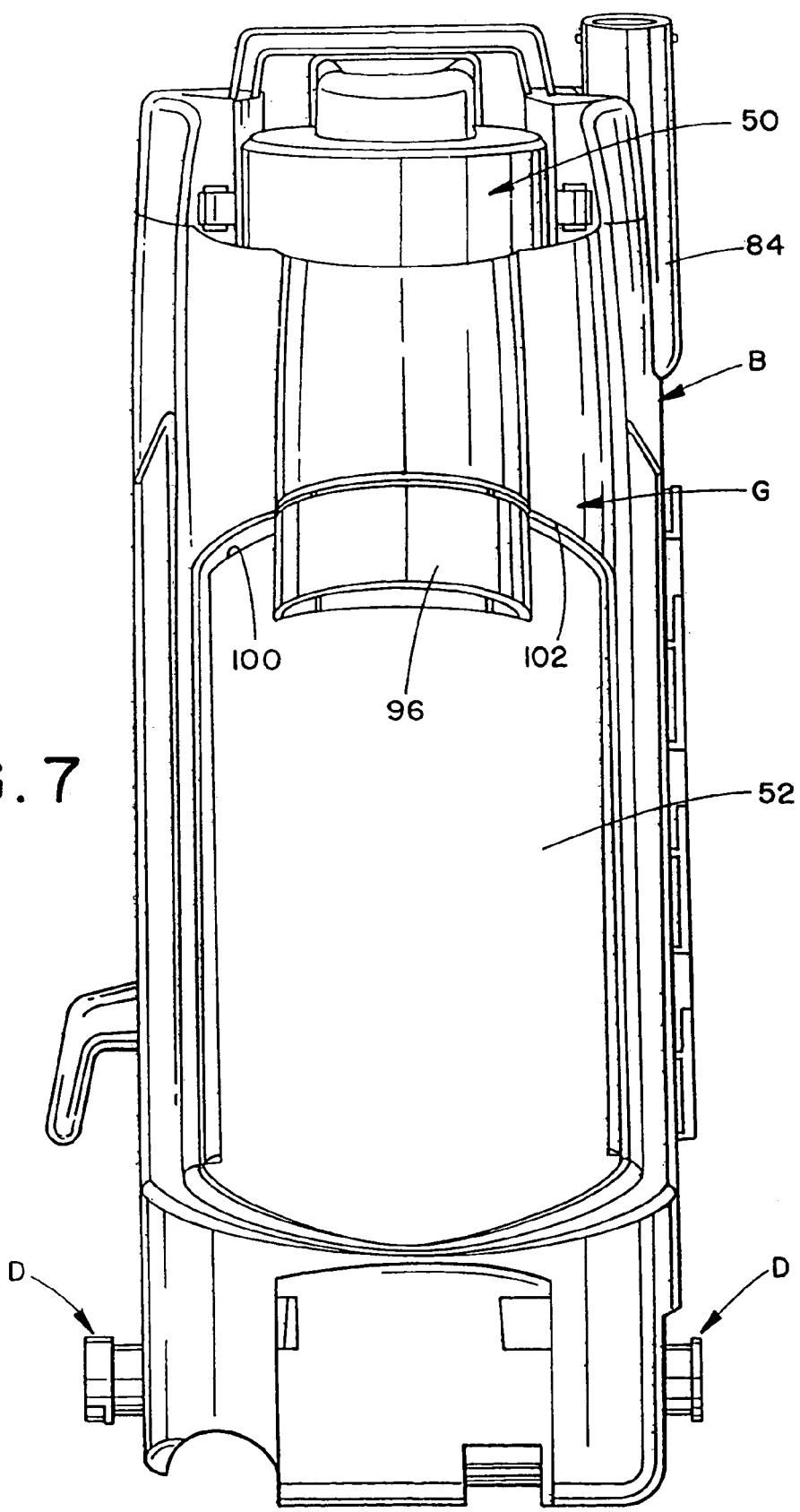
FIG. 7 is a front elevational view of the upright housing portion of the vacuum cleaner of FIG. 1.

With reference now particularly to FIGS. 7 and 9, the cyclonic suction airflow dust and dirt separating region G housed in the upright section B includes and is defined by an upper housing assembly 50 and a mating dust and dirt cup or container 52. These sections 50,52 together define a generally cylindrical cyclonic airflow chamber 54. The upper housing section 50 includes a suction airflow outlet passage 60 that communicates with the cyclonic chamber 54 through an aperture 62. The outlet passage 60 also communicates with the motor/fan assembly E by way of the elongated suction conduit 46. FIG. 9 shows that the elongated suction conduit 46 extends from the motor/fan assembly E upward to communicate with the upper housing suction outlet passage 60 so that the suction inlet of the motor/fan assembly E is able to fluidically communicate with the cyclonic chamber 54. It is preferred that the aperture 62 be centrally located in the cyclonic chamber 54.

The dirt cup or container 52 defining the lower portion of the cyclonic airflow dust and dirt separating chamber 54 is constructed for large capacity and ease of emptying the contents as necessary. The dirt container 52 defines over half the total volume of the cyclonic chamber 54. The capacity of the container 52 is maximized to lengthen the operational time before the dirt container 52 must be emptied. Furthermore, the dirt container 52 is preferably at least partially transparent so that an operator of the vacuum is able to view the level of dirt and dust L accumulated therein for purposes of determining when the container should be emptied.

The dirt container 52 is connected to the vacuum upright section B through use of a hinge assembly 90 that allows the dirt container 52 to pivot (as indicated by the arrow P) between the illustrated closed, operative position and an open forwardly tilted position. Once the dirt container 52 is pivoted into its open position, it may be pulled upward and away from the section B and separated therefrom for ease of emptying the dirt container. A handle 96 is provided on the exterior of the container 52 to facilitate operator movement of the container between the open and closed positions, and a resiliently biased latch 98 retains the dirt container in the closed position for vacuuming operations.

The dirt container upper edge 100 defining an open upper end of the container 52 is preferably inclined downwardly in the direction away from the handle 96 or front of the container 52. The upper housing section 50 is formed with a complimentary mating inclined lower edge 102, and a seal such as a gasket or other structure (not shown) is preferably provided between the edges 100,102 to prevent air leakage into the cyclonic airflow chamber 54. The inclined upper edge 100 of the dirt container 52 also ensures that, when the container is pivoted to the open position, the upper edge 100 lies in a substantially horizontal plane. Therefore, the contents of the container are much less likely to spill when the container is opened during emptying operations. Preferably, the angle at which the upper edge 100 is inclined from horizontal is selected, in combination with the maximum distance the container is able to be pivoted on the arc P when opened, such that when the container is fully opened, the upper edge lies in a substantially horizontal plane.

Figure 13:
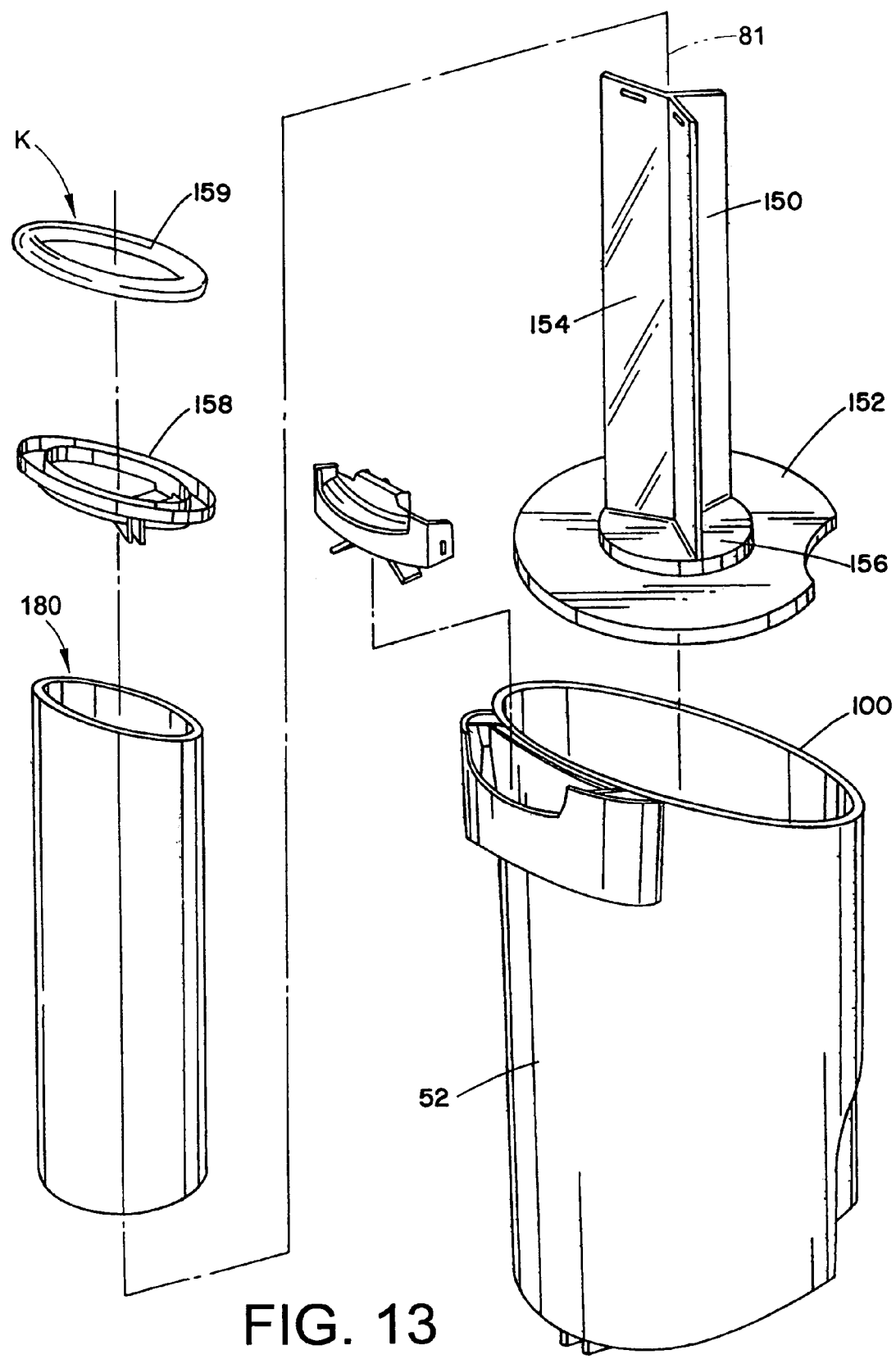
FIG. 13 is an exploded perspective view of a dirt cup, main filter assembly, and filter mount means as employed in the vacuum cleaner of FIG. 9.
Figure 14:
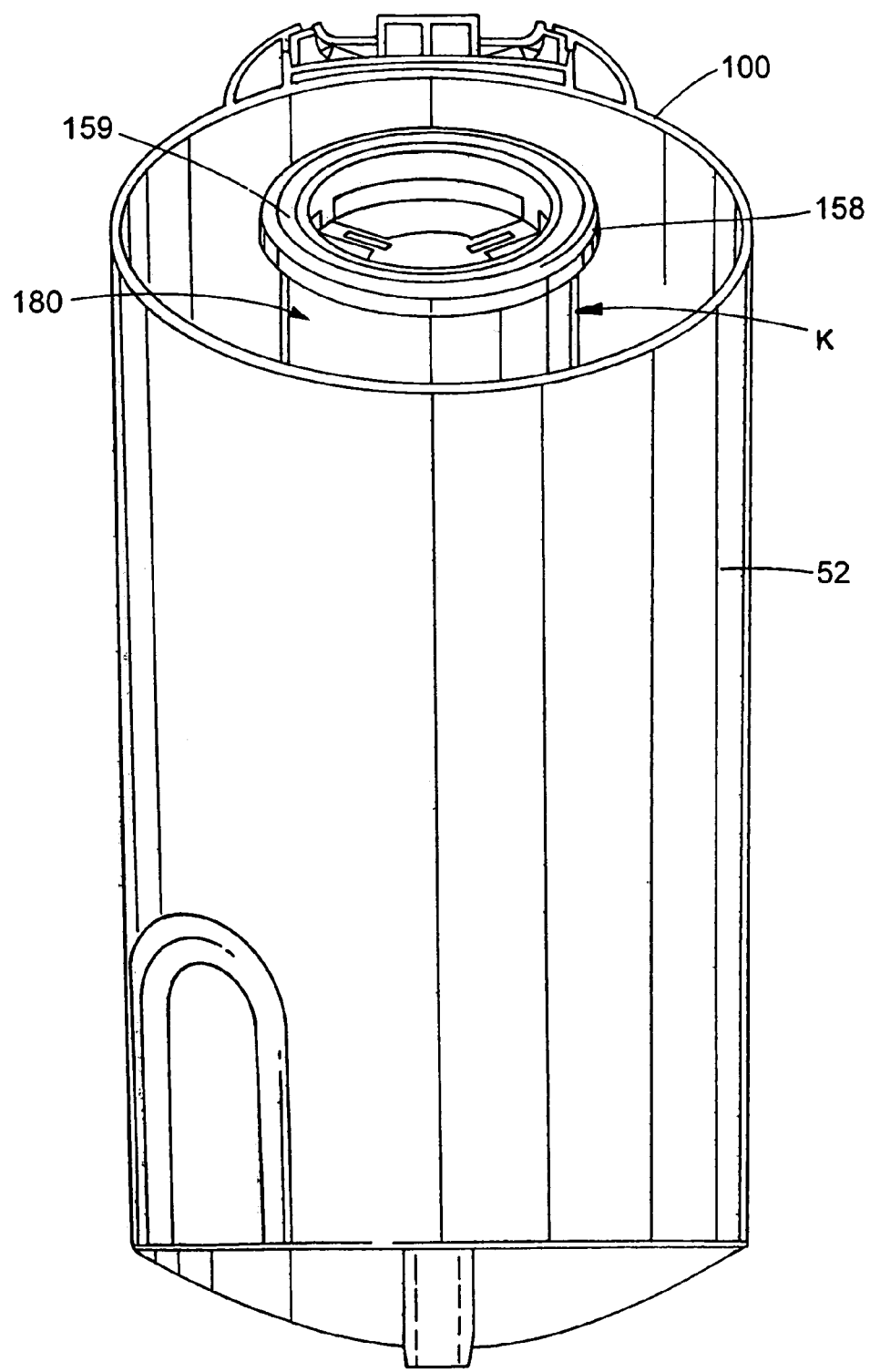
FIG. 14 is a rear elevational view of the dirt cup, main filter assembly, and filter mount means of FIG. 13 in an assembled condition.

The dirt cup 52 is shown in further detail in FIGS. 13 and 14. It includes a main filter support such as a post, stem, or like structure 150 projecting upwardly from a floor or base 152. The floor 152 of the filter support also defines the floor of the dirt cup 52 when the main filter support is seated and suitably secured in the dirt cup. When the main filter support is operatively positioned in the dirt cup 52, the post 150 is centrally positioned in the cyclonic airflow chamber 54 defined by the upper housing member 50 and the dirt cup 52 on a central axis 81.

A hollow, cylindrical main filter assembly K is positioned over the main filter support 150. The filter assembly K is engaged in an interference fit with vanes 154 and/or a disc-like plateau or boss 156 located on the floor 152 of the filter support so that the filter assembly K is releasably, yet securely, retained in its operative position as shown herein, even when the dirt cup 52 is removed from the vacuum cleaner and inverted for purposes of emptying the contents thereof. An upper filter ring 158, accommodating a gasket 159, is provided along the uppermost edge of a main filter medium membrane 180, and the main filter assembly K extends upwardly from the floor 152 to a level approximately equal to an upper edge 100 of the dirt cup 52. Most preferably, the uppermost edge of the main filter assembly K as defined by the ring 158 is also sloped in the same manner as is the dirt cup upper edge 100. Over the entire height of the dirt cup 52, an annular cyclonic airflow passage is defined between the main filter assembly K and the surrounding portion of the dirt cup 52.

Figure 15:
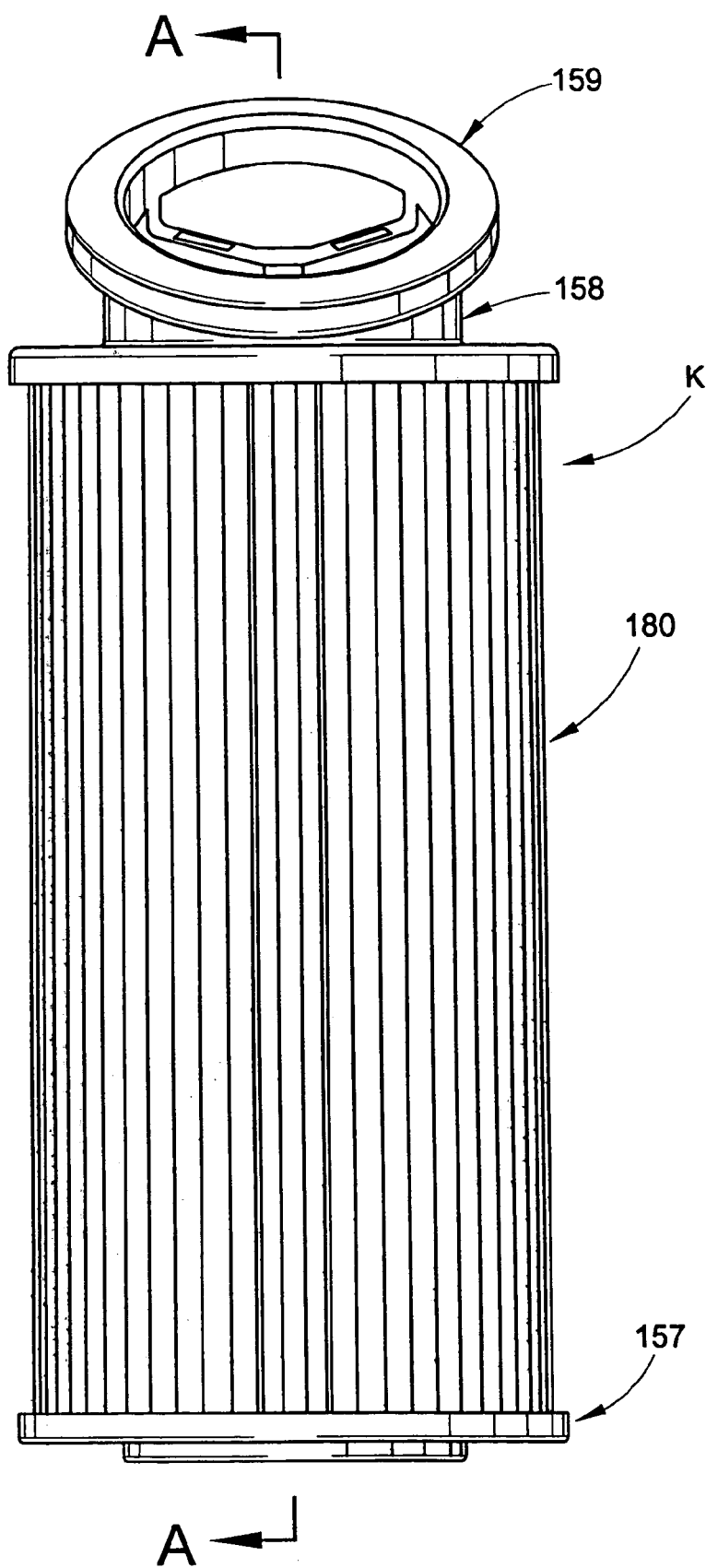
FIG. 15 is a rear elevational view of a preferred main filter assembly formed in accordance with the present invention; and, FIG. 16 is a view taken along line A—A of FIG. 15.
Figure 16:
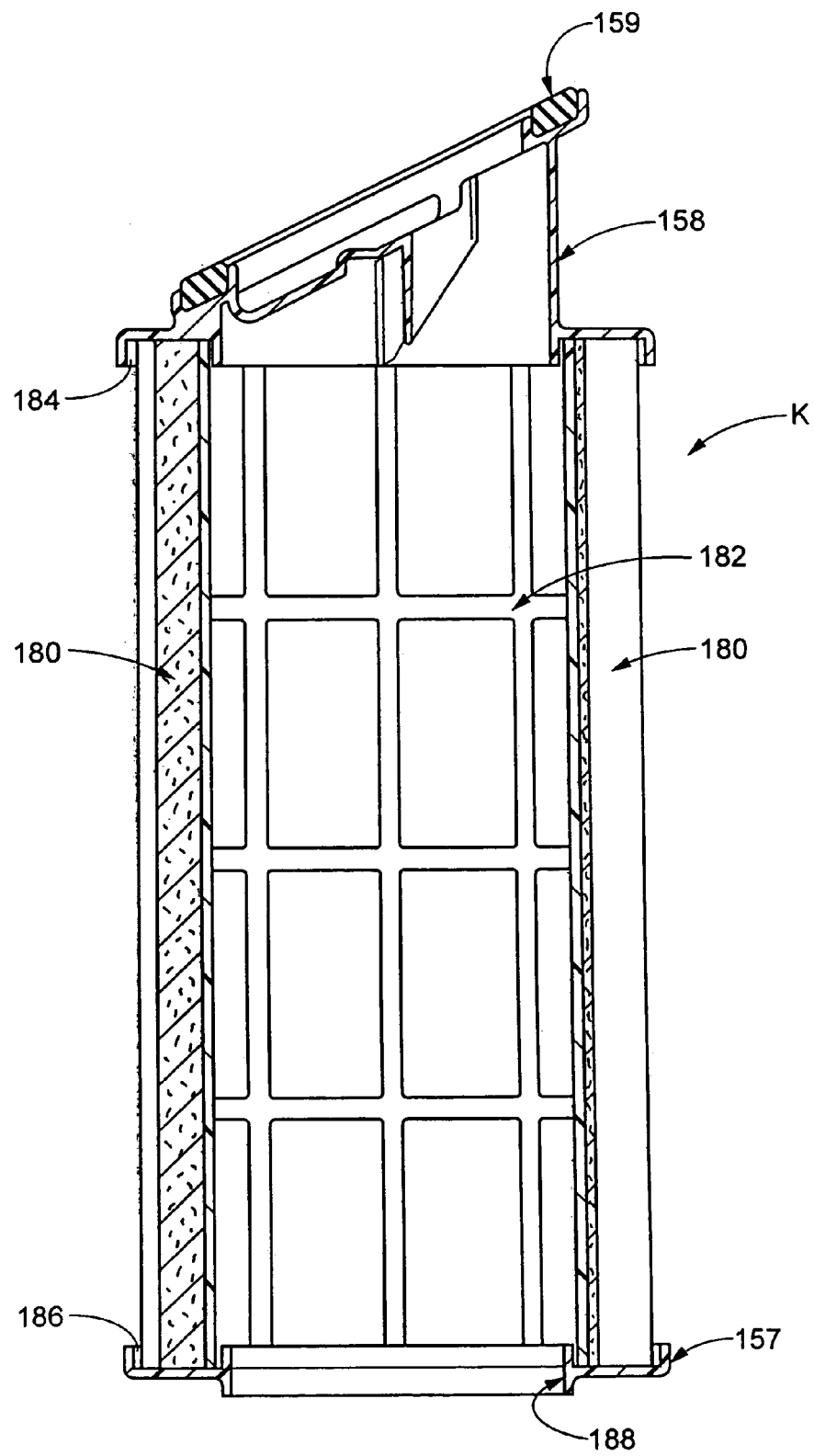

A preferred embodiment of the main filter assembly K is illustrated in further detail in FIGS. 15 and 16. The main filter medium membrane 180 is defined in a hollow, tubular, cylindrical form from a planar, pleated filter membrane. An upper end of the pleated membrane 180 is seated in an annular groove 184 defined by the upper filter ring 158. Likewise, a lower end of the pleated filter membrane 180 is seated in an annular groove 186 defined by a lower filter ring 157. The rings 157,158 are preferably defined from molded plastic, and the lower ring 157 defines an aperture 188 that closely receives the boss 156 projecting from the filter support floor 152 with a tight, friction fit. The upper filter ring 158 is conformed in a manner so that, when the dirt cup 52 is in its closed position, the gasket 159 mates in a fluid-tight manner with the entire peripheral extent of the lowermost edge 166 of an upper conduit 160 (FIG. 9) depending into the cyclonic chamber 54 from the upper housing member 50 so as to prevent undesired airflow through an axial space between the depending conduit 160 and the filter assembly K. The pleated filter membrane 180 is internally supported on an open frame structure 182 that extends axially between and interconnects the lower and upper filter rings 157,158. The open frame structure 182 does not impede airflow through the pleated filter element 180, but ensures that the filter element will not collapse under the force of the suction airstream J.

A preferred medium for the filter membrane 180 comprises polytetrafluoroethylene (PTFE), a polymeric, plastic material commonly referred to by the registered trademark TEFLON®. The low coefficient of friction of a filter medium comprising PTFE facilitates cleaning of the filter element by washing. Most preferably, the pleated filter medium 180 is defined substantially or entirely from GORE-TEX®, a PTFE-based material commercially available from W. L. GORE & ASSOCIATES, Elkton, Md. 21921. The preferred GORE-TEX® filter medium, also sold under the trademark CLEANSTREAM® by W. L. GORE & ASSOCIATES, is an expanded PTFE membrane defined from billions of continuous, tiny fibrils. The filter blocks the passage of at least 99% of particles 0.3 μm in size or larger. Although not visible in the drawings, the inwardly and/or outwardly facing surface of the CLEANSTREAM® filter membrane 180 is preferably coated with a mesh backing material of plastic or the like for durability since it enhances the abrasion-resistance characteristics of the plastic filter material. The mesh may also enhance the strength of the plastic filter material somewhat.

Figure 10:
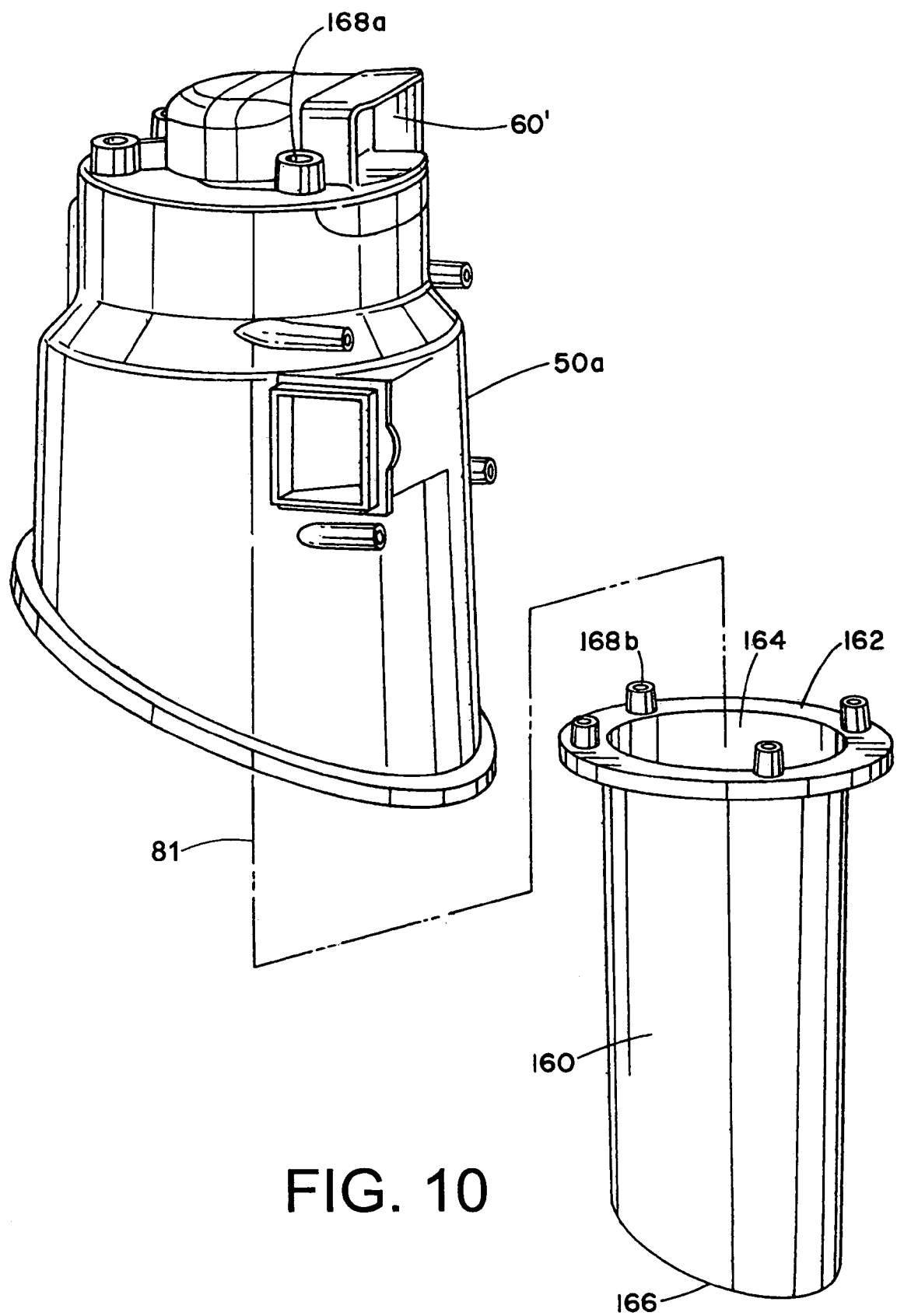
FIG. 10 is an exploded perspective view of an upper housing member and associated depending upper conduit of the vacuum cleaner of FIG. 9.
Figure 11:
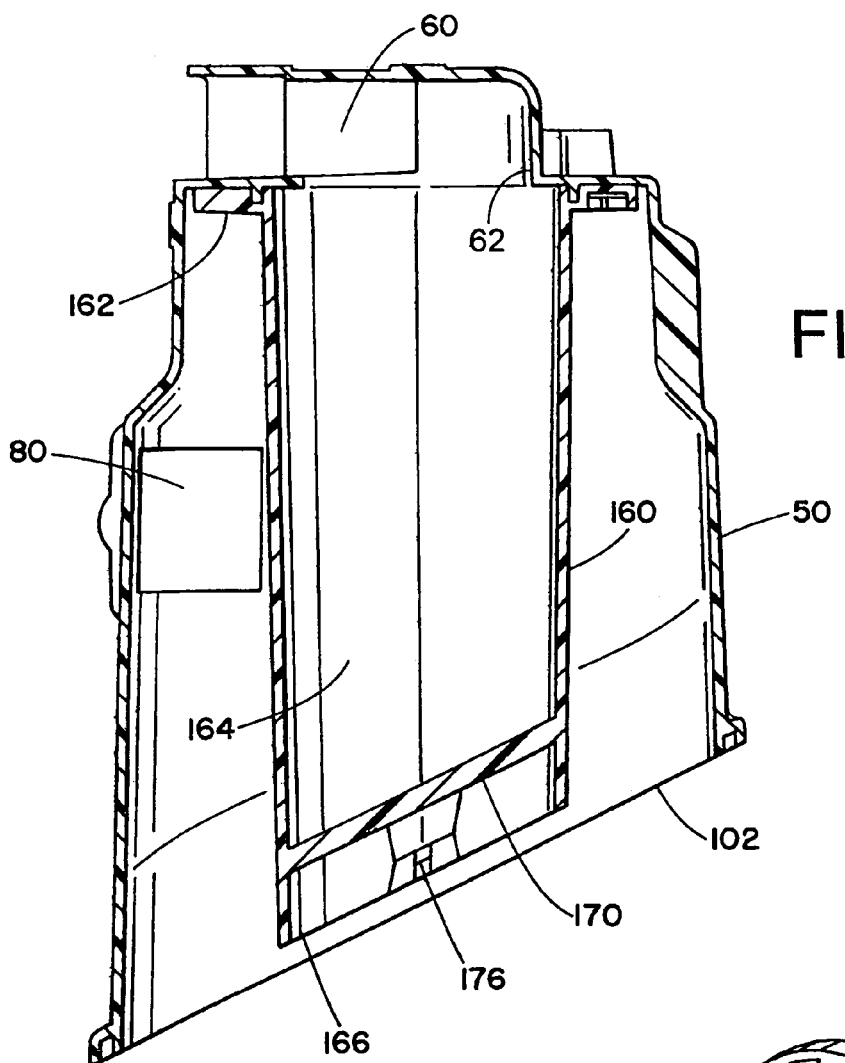
FIG. 11 is a cross-sectional view of the assembled upper housing member and conduit of FIG. 10.
Figure 12:
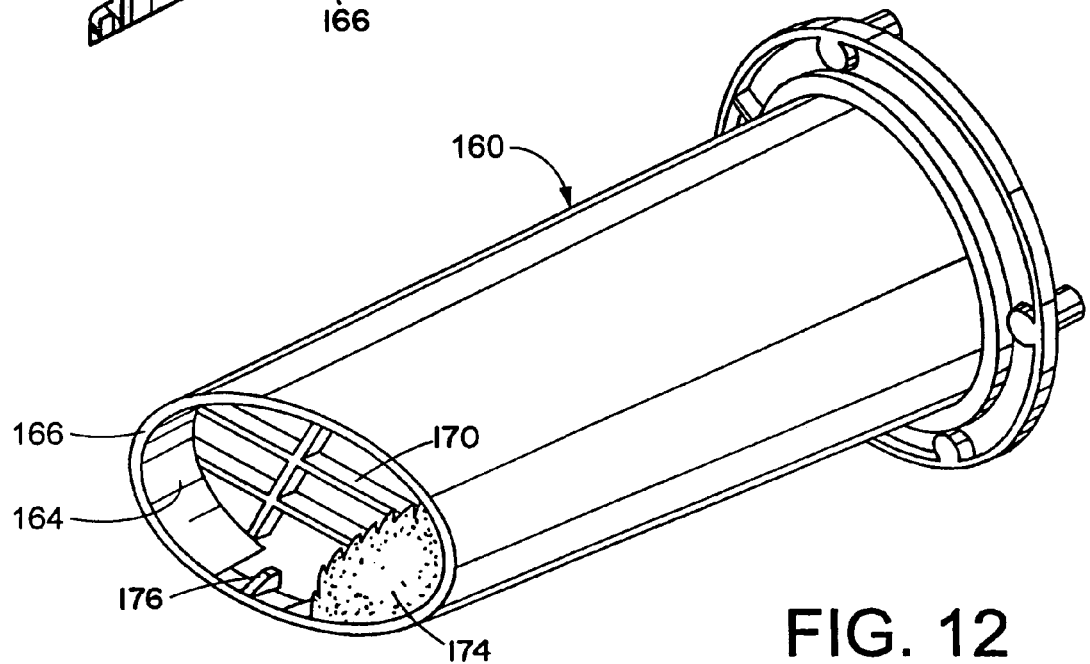
FIG. 12 is a perspective view of the upper conduit of FIG. 10.

Referring now also to FIGS. 10–12, the relationship of the upper housing member 50 and the depending upper conduit 160 is described. The conduit 160 projects centrally downwardly into the chamber 54 from a top wall 162 of the housing member 50. The upper conduit 160 is preferably a hollow cylindrical member with a bore 164 extending therethrough. The bore 164 is in fluid communication with the suction airstream outlet passage 60 through which the suction airflow J exits the cyclonic airflow chamber 54. The conduit 160 projects downwardly from the housing top wall 162 so that the lowermost edge 166 thereof is approximately equal to the level of the lower edge 102 of the housing member 50. Also, the lower edge 166 is sloped in a manner that corresponds to the slope of the housing member lower edge 102. The upper conduit 160 is connected to the upper housing member 50 by an suitable means such as fasteners engaged in aligned bores 168a, 168b (FIG. 10) respectively formed in the housing member 50 and conduit 160. As mentioned, the gasket 159 is provided along the joint between the lowermost edge 166 of the upper conduit 160 and the upper edge of the filter assembly K.

With reference now specifically to FIG. 12, an auxiliary filter support grid or framework 170 is provided and extends across the bore 164, preferably in the region of the conduit lower edge 166. The open filter support 170 provides a backing member for a foam, paper, or similar conventional auxiliary filter element 174 that removes any residual dust and dirt from the suction airstream J prior to its exit from the cyclonic airflow chamber 54 through the bore 164 and outlet passage 60. In case there is a break in the seal between the filter assembly K and the conduit 160, the auxiliary filter 174 will prevent dirt or dust from being sucked into the motor/fan assembly E of the vacuum cleaner A. One or more tabs or teeth 176 project radially inwardly from the conduit 160 in the region of the framework 170 to engage the auxiliary filter element 174 so that the filter element is secured adjacent the framework 170 and will not be dislodged from its operative position by the force of gravity.

As is most readily apparent in FIG. 9, the main filter assembly K and the upper conduit 160 together define a hollow cylindrical column extending through the center of the cyclonic airflow chamber 54 entirely between the floor 152 and top wall 162. This preferred cylindrical columnar shape also results from the main filter assembly K and the upper conduit 160 having substantially the same outside diameter.

The suction airstream J established and maintained by the motor/fan assembly E enters an upper portion of the cyclonic dust and dirt separation chamber 54 through a generally tangential or offset suction airstream inlet 80 that is preferably horizontally oriented. In the preferred embodiment, as may be seen most clearly with reference to FIGS. 10 and 11, the cyclonic chamber airstream inlet 80 is formed in the upper housing member 50, and it is noted that the inlet 80 is disposed entirely on one side of a centerline 81 of the upper housing section so as to induce a swirling flow in the chamber 54. As shown in FIG. 5, the suction airstream inlet 80 is in fluid communication with a suction airstream hose 82 through a fitting 84, and the airstream hose 82 is, itself, fluidically connected with the main suction opening 26 formed in the underside of 10 the nozzle base C by way of the conduit 34 and a fitting 86. As such, the main suction opening 26 is in fluid communication with the cyclonic chamber 54 through the passage 30, the hoses 34,82, and the cyclonic chamber suction inlet 80.

Figure 8:
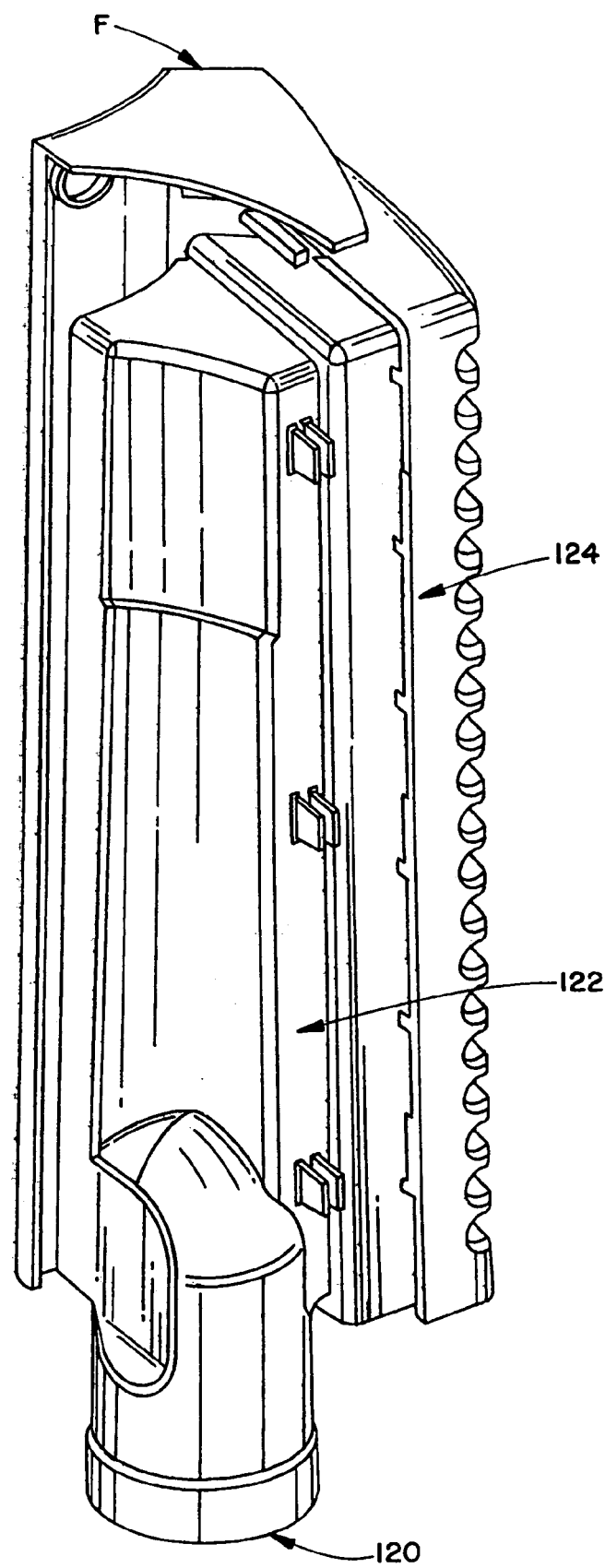
FIG. 8 is a perspective view of the final filter assembly in accordance with the present invention.

The vacuum A also comprises the final filter assembly F (see e.g., FIGS. 1–3 and 5) adapted for filtering the suction airstream downstream from the motor/fan assembly and immediately prior to its exhaustion into the atmosphere. A preferred structure of the final filter assembly F is illustrated most clearly in FIG. 8 and comprises a suction airstream inlet 120 which is connected downstream and in fluid communication with the exhaust outlet 42 of the motor and fan assembly E. The inlet 120 communicates with an elongated plenum 122 that opens to the atmosphere and houses a filter medium. A protective grid or grate structure 124 is snap-fit or otherwise effectively secured over the plenum 122 to secure the filter medium in place. The filter medium is preferably a high efficiency particulate arrest (HEPA) filter element in a sheet or block form. The filter medium is retained in position in the plenum by the grid 124, but is easily replaced by removing the grid. As such, those skilled in the art will recognize that even if the motor/fan assembly causes contaminants to be introduced into the suction airstream downstream from the main filter element H, the final filter assembly F will remove the same such that only contaminant-free air is discharged into the atmosphere.

Referring now primarily to FIGS. 5 and 9, the operation of the vacuum cleaning apparatus A is illustrated, with the flow of the suction airstream indicated by use of arrows J. The motor/fan assembly E or other suction generator establishes a suction force at its suction inlet 40, in the elongated suction conduit 46, and thus in the cyclonic separation chamber 54. This suction force or negative pressure in the chamber 54 is communicated to the main suction opening 26 formed in the nozzle underside 24 through the hoses 82,34 and associated fittings. This, then, in combination with the scrubbing action of the rotating brush assembly 36 causes dust and dirt from the surface being cleaned to be entrained in the suction airflow J and pulled into the upper portion of the chamber 54 through the generally tangential inlet 80.

As the suction airstream J enters the cyclonic chamber 54 through the inlet 80, it travels downwardly in a cyclonic fashion so that a portion of the dust and dirt entrained in the suction airstream are separated therefrom and collected in the dirt cup 52 (as indicated at L). The suction airstream J then passes through the main filter assembly K to remove residual contaminants therefrom, and moves upwardly through the main filter element K, through the auxiliary filter element 174, and into the bore 164 of the depending conduit 160. The airstream J is prevented from bypassing the main filter element K by the gasket 159 positioned axially between the filter assembly K and the conduit 160. The airstream J then exits the cyclonic airflow chamber 54 through the outlet passage 60 and moves downwardly through the conduit 46 to the inlet 40 of the motor/fan assembly E and is then exhausted through the motor exhaust outlet 42 to the final filter assembly F where it is filtered-again by the HEPA filter to remove any contaminants that passed through the chamber 54, the main filter assembly K, the auxiliary filter 174, and also any contaminants introduced into the airstream by the motor/fan assembly E, itself.

The position of the main filter assembly K., extending upwardly from the floor 152, is highly desirable given that, as dust and dirt L are collected, at least a portion M of the suction airstream passes through the accumulated dust and dirt L. The accumulation of dust and dirt L seems to act as yet another filter element which filters more dust and dirt from the airstream M. Also, the flow of the suction airstream M downwardly through the accumulated dust and dirt L acts to compact the dust and dirt L downwardly toward the floor 152 so that the capacity of the dirt cup 52 is efficiently utilized to extend the time before the dirt cup must be emptied. As noted, a main advantage of the present invention is that the main filter assembly K can be cleaned by washing it, either manually or in a dishwasher—since it is dishwasher-safe—to remove dust or dirt particles adhering to the filter element.

The orientation of the inlet 80 will affect the direction of cyclonic airflow, and the invention is not meant to be limited to a particular direction, i.e, clockwise or counterclockwise. Those skilled in the art will certainly recognize that the term "cyclonic" as used herein is not meant to be limited to a particular direction of airflow rotation. This cyclonic action separates a substantial portion of the entrained dust and dirt from the suction airstream and causes the dust and dirt to be deposited in the dirt cup or container.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An upright vacuum cleaner comprising:
    a first housing member comprising a dirt separation chamber adapted for separating entrained dirt and dust from an airstream;
    a second housing member defining a main suction opening, said second housing member being pivotally mounted to said first housing member;
    a first conduit for fluidically connecting said main suction opening to an inlet of said dirt separation chamber;
    an airstream suction source, mounted to one of said first and second housing members, positioned downstream from said separation chamber and in communication therewith, said airstream suction source being located beneath said dirt separation chamber;
    a dust cup removably mounted to said first housing member, said dust cup being impervious to-airflow and comprising at least a part of said dirt separation chamber; and,
    a first filter located adjacent an outlet end of said dirt separation chamber, said first filter being mounted to said dust cup and removable with said dust cup from said first housing member when said dust cup is emptied.

2. The vacuum cleaner of claim 1 wherein said first filter is approximately cylindrical in shape.

3. The vacuum cleaner of claim 1 wherein a filter medium of said first filter comprises a pleated planar material.

4. The vacuum cleaner of claim 1 further comprising a support structure for supporting said first filter.

5. The vacuum cleaner of claim 1 wherein said first filter is oriented to be approximately coaxial with a longitudinal axis of said dirt separation chamber.

6. The vacuum cleaner of claim 1 wherein said first filter is oriented to be approximately coaxial with a longitudinal axis of said dust cup.

7. The vacuum cleaner of claim 1 wherein said first filter is detachable from said dust cup.

8. The vacuum cleaner of claim 1 further comprising a second filter, mounted to one of said first and second housing members.

9. The vacuum cleaner of claim 8 wherein said second filter is positioned downstream from said first filter.

10. The vacuum cleaner of claim 9 wherein at least one of said first and second filters comprises a high efficiency particulate arrest (HEPA) material.

11. The vacuum cleaner of claim 1 wherein said first filter comprises a porous thermoplastic material.

12. A vacuum cleaner comprising:
    an upright housing defining an airflow chamber for separating dirt from an airstream, said airflow chamber including a tangential inlet and an outlet and being at least partially defined by a dust cup that collects dirt separated from an the airstream flowing through said chamber, said dust cup being selectively removable from a remainder of said upright housing for emptying;
    a nozzle base hingedly interconnected with said upright housing, said nozzle base including a suction opening, said suction opening being in fluid communication with said inlet of said airflow chamber;
    a suction source mounted to one of said upright housing and said nozzle base, said suction source being located beneath said dust cup and being in fluid communication with said outlet of said airflow chamber; and, a filter detachably mounted to said dust cup, wherein said filter is removed together with said dust cup from said upright housing and spaced away from said nozzle base when said dust cup is emptied.

13. The vacuum cleaner of claim 12 wherein said dust cup comprises a handle.

14. The vacuum cleaner of claim 12 wherein said dust cup is at least partially transparent.

15. The vacuum cleaner of claim 12 further comprising a latch assembly for selectively securing said dust cup to said upright housing.

16. The vacuum cleaner of claim 12 further comprising a support on which said filter is mounted.

17. The vacuum cleaner of claim 12 wherein said nozzle base comprises a rotating brush.

18. The vacuum cleaner of claim 12 wherein said upright housing comprises a socket in which said dust cup is selectively mounted.

19. The vacuum cleaner of claim 12 wherein said filter is approximately cylindrical in shape.

20. The vacuum cleaner of claim 19 wherein said approximately cylindrical filter includes a hollow radially inner central portion.

21. The vacuum cleaner of claim 12 wherein said filter comprises a pleated planar material.

22. The vacuum cleaner of claim 12 wherein said filter comprises a porous thermoplastic material.

23. An upright vacuum cleaner comprising:
a first housing comprising a dirt separation chamber at least partially defined by a removable dust cup, said dirt separation chamber separating dirt and dust from an airstream flowing through said chamber, said dust cup receiving and retaining dirt and dust separated from said airstream in said dirt separation chamber;
a second housing having a suction opening, said suction opening being fluidically connected to said dirt separation chamber, said second housing being hingedly connected to said first housing;
a suction source for establishing and maintaining the airstream that flows into said suction opening, then into said dirt separation chamber and next out of said dirt separation chamber, said suction source being located beneath said dirt separation chamber; and,
a filter mounted to a wall of said dust cup, such that said filter is removed with said dust cup from said first housing, wherein said filter is detachable from said dust cup.

24. The vacuum cleaner of claim 23 wherein said dust cup comprises a handle.

25. The vacuum cleaner of claim 23 wherein said dust cup is at least partially transparent.

26. The vacuum cleaner of claim 23 further comprising a latch assembly for selectively securing said dust cup to said first housing.

27. The vacuum cleaner of claim 23 further comprising support on which said filter is mounted.

28. The vacuum cleaner of claim 23 wherein said second housing comprises a rotating brush.

29. The vacuum cleaner of claim 23 wherein said first housing comprises a socket in which said dirt cup is selectively mounted.

30. The vacuum cleaner of claim 23 wherein said filter comprises an approximately cylindrical member.

31. The vacuum cleaner of claim 30 wherein said approximately cylindrical filter includes a hollow radially inner central portion.

32. The vacuum cleaner of claim 23 wherein said filter comprises a pleated planar material.

33. The vacuum cleaner claim 23 wherein said filter comprises a porous thermoplastic material.

34. An upright vacuum cleaner comprising:
a housing;
a nozzle base hingedly interconnected with said housing, said nozzle base including a main suction opening in an underside thereof; an air separation chamber defined in said housing and adapted for separating dust and dirt from an airstream, said main suction opening being in fluid communication with said air separation chamber;
an airflow source located in one of said upright housing and said nozzle base and having an airflow inlet in fluid communication with said air separation chamber and an airflow outlet;
a first filter located in said housing for filtering dust and dirt from the airstream that passes through said air separation chamber, said filter including a pleated filter material and being located adjacent an outlet end of said air separation chamber and being located upstream from said airflow source;
a dirt container selectively mounted to said housing, said dirt container comprising at least a portion of said air separation chamber;
a tangential inlet for delivering dust laden air to said dirt container; and,
an axial outlet from said dirt container.

35. The upright vacuum cleaner as set forth in claim 34 further comprising:
a second filter in fluid communication with said airflow outlet of said airflow source and adapted for filtering said airstream exhausted by said airflow source prior to said airstream being dispersed into the atmosphere.

36. The upright vacuum cleaner as set forth in claim 35 wherein one of said first and second filters comprises a high efficiency particulate arrest (HEPA) filter medium.

37. The upright vacuum cleaner as set forth in claim 34 wherein said airflow source communicates with said air separation chamber through a conduit extending between them.

38. The upright vacuum cleaner as set forth in claim 34 wherein said first filter comprises a thermoplastic material.

39. The upright vacuum cleaner as set forth in claim 38 wherein said first filter comprises a filter medium for blocking at least 99% of particles having a size of at least 0.3 µm.

40. The upright vacuum cleaner as set forth in claim 34 wherein said dirt container is adapted for pivoting movement between an angled position, in which it can be detached from said housing and an upright position in which said dirt container functions as said at least a portion of said dirt air separation chamber.

41. The upright vacuum cleaner as set forth in claim 34, wherein said first filter is approximately cylindrical in shape.

42. The upright vacuum cleaner as set forth in claim 35 further comprising:
a third filter element positioned between said first filter and said airflow source.

43. An upright vacuum cleaner comprising;
an upright housing comprising an opening for holding a selectively removable dirt cup that at least partially defines a cyclonic dirt separation chamber for separating contaminants from an airstream, said housing further defining an airstream inlet to said dirt separation chamber and an airstream outlet from said dirt separation chamber;

a nozzle base pivotably connected to said upright housing and including a main suction opening, said main suction opening being fluidically connected with said chamber airstream inlet;

an airstream source, located in one of said upright housing and said nozzle base, for selectively establishing and maintaining a flow of the airstream; and, an approximately cylindrical first filter positioned in the upright housing adjacent said airstream outlet of said dirt separation chamber and upstream from said suction airstream source, said first filter filtering residual contaminants from the airstream prior to the airstream flowing to said suction airstream source.

44. The vacuum cleaner as set forth in claim 43 wherein said first filter comprises a thermoplastic material.

45. The vacuum cleaner as set forth in claim 44 wherein a filter medium of said first filter comprises a pleated planar material.

46. The vacuum cleaner as set forth in claim 44 wherein a filter medium of said first filter is supported by a support structure.

47. The vacuum cleaner as set forth in claim 44 wherein said first filter is arranged to be approximately coaxial with a central longitudinal axis of said dirt separation chamber.

48. The vacuum cleaner as set forth in claim 47 wherein said inlet of said dirt separation chamber is horizontally oriented and arranged so that the airstream entering said dirt separation chamber through said airstream inlet moves cyclonically about an approximately vertical axis extending in said dirt separation chamber.

49. The vacuum cleaner as set forth in claim 43, wherein said a filter medium of said first filter blocks passage of at least 99% of particulates that have a size of at least 0.3 µm.

50. The vacuum cleaner as set forth in claim 43 further comprising:

a second filter for filtering particulates from the airstream exiting said dirt separation chamber.

51. An upright vacuum cleaner comprising:

an upright housing defining an airflow chamber for separating dirt from an airstream flowing through said chamber, said chamber being at least partially defined by a dirt cup, said dirt cup being selectively removable from said upright housing for emptying;

a nozzle base hingedly interconnected with the upright housing, said nozzle base including a main suction opening;

a suction source located in one of said upright housing and said nozzle base and being in fluid communication with said main suction opening via said airflow chamber;

a main filter element mounted to said dirt cup and operably positioned in said upright housing for filtering dirt from said airstream before said airstream flows to said suction source, said main filter element being removed with said dirt cup from said upright housing when said dirt cup is emptied, wherein said main filter element is detachable from said dirt cup; and, wherein said main filter element is positioned above said suction source.

52. The upright vacuum cleaner as set forth in claim 51 further comprising:

a final filter element connected in fluid communication with said suction source and positioned adjacent an outlet from which said airstream is exhausted from said upright housing into the atmosphere, said final filter element adapted for filtering an said airstream exhausted from said suction source prior to said airstream being dispersed into the atmosphere.

53. The upright vacuum cleaner as set forth in claim 51 wherein said main filter element includes a cleanable filter material.

54. The upright vacuum cleaner as set forth in claim 53, wherein said cleanable filter material is pleated and comprises a plastic material.

55. An upright vacuum cleaner apparatus comprising:

a base portion including a nozzle defining a main suction opening;

a housing including a handle, said housing being hingedly connected to said base portion;

a suction source in fluid communication with said main suction opening, the suction source being disposed in one of the base portion and the housing;

a dirt cup mounted to said housing and comprising an airflow chamber in fluid communication with said suction source for imparting a cyclonic flow pattern to an airstream that flows through said airflow chamber, whereby a portion of particulates entrained in said airstream is separated from said airstream leaving residual particulates entrained in said airstream, wherein said dirt cup collects said portion of particulates separated from said airstream, and is selectively removable from said housing; and, a pleated filter member located adjacent an outlet of said airflow chamber for filtering at least some of the residual particulates, said filter member being selectively removable from said housing.

56. The upright vacuum cleaner apparatus as set forth in claim 55 wherein said filter member comprises a polytetrafluoroethylene (PTFE) material.

57. The upright vacuum cleaner apparatus as set forth in claim 55, wherein said filter member comprises a porous thermoplastic material.

58. The upright vacuum cleaner apparatus as set forth in claim 55, wherein said filter member is approximately cylindrical in shape.

59. The upright vacuum cleaner apparatus as set forth in claim 55, further comprising a filter support located in said housing and adapted to releasably support said filter member.

60. The upright vacuum cleaner apparatus as set forth in claim 55, wherein said filter member comprises a cleanable filter member.

61. An upright vacuum cleaner comprising:

a nozzle section;

a housing section pivotably connected to said nozzle section;

a dirt cup removably mounted to said housing section, said dirt cup comprising a dirt separation chamber for separating dirt and dust from an airstream that flows therethrough, said dirt separation chamber being in fluid communication with said nozzle section, wherein said dirt cup is removed from said housing section for emptying;

a suction source for the airstream, said suction source being mounted to one of said nozzle section and said housing section;

a filter located in said housing section adjacent an outlet of said dirt separation chamber for filtering the airstream before it flows to said suction source, said suction source being located beneath said filter, said filter comprising a porous thermoplastic material.

62. The upright vacuum cleaner as set forth in claim 61, wherein said filter is connected to said dirt cup.

63. The upright vacuum cleaner as set forth in claim 62, further comprising a latch for selectively fixedly securing an upper portion of said dirt cup to said housing section.

64. The upright vacuum cleaner as set forth in claim 61, wherein said filter comprises a pleated material.

65. The upright vacuum cleaner as set forth in claim 61, wherein the filter is disposed relative to the dirt separation chamber such that the airstream is partially filtered by the dirt separation chamber before said airstream contacts said filter element.

66. An upright vacuum cleaner comprising:
- a housing comprising a dirt separation chamber at least partially defined by a removable dirt cup, said dirt separation chamber separating dirt from an airstream flowing through said chamber by imparting a flow pattern to said airstream, said dirt cup receiving and retaining dirt separated from said airstream in said dirt separation chamber;
- a nozzle having a suction opening, said suction opening being fluidically connected to said dirt separation chamber;
- a suction source, connected to said dirt separation chamber, for establishing and maintaining the airstream that flows into said suction opening, next into said dirt separation chamber, and then toward said suction source, said suction source being mounted to one of said housing and said nozzle and being located beneath said dirt separation chamber; and,
- a filter element releasably mounted in said housing and positioned to filter said airstream after said airstream has moved through said dirt separation chamber, wherein said filter element is mounted to said dirt cup so as to be removable with said dirt cup.

67. The upright vacuum cleaner as set forth in claim 66, wherein said housing defines a region for receiving and supporting a portion of said removable dirt cup and a latch for selectively fixedly securing said dirt cup to said housing.

68. The upright vacuum cleaner as set forth in claim 66, wherein said filter element comprises a thermoplastic material.

69. An upright vacuum cleaner comprising:
- a base portion;
- an upright housing section hingedly connected to the base portion;
- a suction source mounted to one of said base portion and said upright housing section;
- a dirt cup removably mounted to said upright housing section, wherein said dirt cup is impervious to airflow and wherein said dirt cup is removed from said upright housing section for emptying;
- an approximately cylindrical filter located in and removable from said upright housing section for filtering an associated airstream passing through said dirt cup; and,
- wherein said filter is located above said suction source.

70. The upright vacuum cleaner as set forth in claim 69, wherein said filter is releasably secured to said dirt cup and wherein said dirt cup and filter are movable as a unit relative to said upright housing section.

71. The upright vacuum cleaner as set forth in claim 69 wherein said filter comprises a porous thermoplastic material.

72. The upright vacuum cleaner as set forth in claim 71 wherein said filter is pleated.

73. The upright vacuum cleaner as set forth in claim 69 wherein said filter includes a cleanable filter material.

74. The upright vacuum cleaner as set forth in claim 69 wherein said filter includes a hollow radially inner central portion.

* * * * *